US012590804B2

(12) United States Patent
Bagon et al.

(10) Patent No.: US 12,590,804 B2
(45) **Date of Patent: \*Mar. 31, 2026**

(54) MAP FEATURES DELIVERED VIA AUGMENTED REALITY (AR)

(71) Applicant: Mobileye Vision Technologies Ltd., Jerusalem (IL)

(72) Inventors: Eyal Bagon, Jerusalem (IL); Ofer Springer, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/983,866

(22) Filed: Dec. 17, 2024

(65) Prior Publication Data

US 2025/0116523 A1      Apr. 10, 2025

Related U.S. Application Data

(63) Continuation of application No. 17/997,669, filed as application No. PCT/IB2022/058631 on Sep. 13, 2022, now Pat. No. 12,203,758.

(Continued)

(51) Int. Cl.
*G01C 21/30* (2006.01)
*B60Q 9/00* (2006.01)
(Continued)

(52) U.S. Cl.
CPC .............. *G01C 21/30* (2013.01); *B60Q 9/008* (2013.01); *B60R 11/0235* (2013.01);
(Continued)

(58) Field of Classification Search
CPC .......... B60K 2360/177; B60K 2360/27; B60K 2360/29; B60K 35/23; B60K 2360/31;
(Continued)

(56) References Cited

U.S. PATENT DOCUMENTS 10,129,439 B2    11/2018  Murugesan et al.
10,242,457 B1 *   3/2019  Sibley .................. H04N 9/3182
(Continued)

FOREIGN PATENT DOCUMENTS

CN          112129313  A     12/2020

OTHER PUBLICATIONS

Jun. 23, 2025 (EP) Search Report—App. 22866869.
Jan. 11, 2023 (PCT)—International Search Report & Written Opinion—App. PCT/IB2022/058631.

*Primary Examiner* — Koosha Sharifi-Tafreshi
(74) *Attorney, Agent, or Firm* — Banner & Witcoff, Ltd.

(57)      ABSTRACT

Techniques are disclosed for using augmented reality (AR) displays to convey graphical representations of different types of information to a user. The information may be obtained from various sources such as objects and/or features that are dynamically detected by a vehicle or user-generated content. The graphical representations may also be based upon information that may be obtained via the use of crowdsourced AV map data. The graphical representations may be presented in as an AR view in a medium (such as a vehicle windshield) that matches a field of view of a user, thus accurately blending holographic information with the physical objects in the scene.

24 Claims, 8 Drawing Sheets

400

Related U.S. Application Data

(60) Provisional application No. 63/243,484, filed on Sep. 13, 2021.

(51) Int. Cl.

| | |
|---|---|
| *B60R 11/02* | (2006.01) |
| *G06F 3/01* | (2006.01) |
| *G06T 7/73* | (2017.01) |
| *G06T 19/00* | (2011.01) |
| *B60R 11/00* | (2006.01) |

(52) U.S. Cl.
CPC .............. *G06F 3/012* (2013.01); *G06F 3/013* (2013.01); *G06T 7/74* (2017.01); *G06T 19/00* (2013.01); *B60R 2011/0026* (2013.01); *G06T 2207/30252* (2013.01)

(58) Field of Classification Search
CPC .. B60K 2360/175; G06V 20/20; G06V 20/56; G06V 20/59; G06V 20/58; G06V 20/588; A61B 2090/365; G05D 1/0038; G05D 1/2247; G05D 1/2249; G05D 1/0088; G06F 2111/18; G06F 3/013; G06F 3/012; G06T 19/006; G02B 27/01; G02B 27/0093; G02B 2027/0187; G01C 21/365; G01C 21/3644; G01C 21/3641; G01C 21/3635; G01C 21/3602; B60W 2540/225
See application file for complete search history.

(56) References Cited

U.S. PATENT DOCUMENTS

| | | | | |
|---|---|---|---|---|
| 10,488,218 | B2 * | 11/2019 | Kim | ...................... G02B 27/01 |
| 2019/0050651 | A1 | 2/2019 | Alvarez | |
| 2019/0299984 | A1 | 10/2019 | Shalev-Shwartz et al. | |
| 2020/0180656 | A1 | 6/2020 | Kim | |
| 2020/0324787 | A1 | 10/2020 | Wang et al. | |
| 2020/0333159 | A1 | 10/2020 | Jung et al. | |
| 2021/0134248 | A1 | 5/2021 | Wan et al. | |
| 2021/0300418 | A1 | 9/2021 | Alvarez | |
| 2022/0343762 | A1 | 10/2022 | Alvarez | |
| 2024/0255289 | A1 | 8/2024 | Bagon et al. | |

* cited by examiner

100

400

Perform Vehicle Localization 402

Perform Occupant Tracking 404

Generate an AR Display Frame 406

Computational Delay

Compute the Vehicle and Occupant Motion During the Delay Period 408

Apply Motion Compensation to the Generated AR Display Frame 410

Display the AR Display Frame 412

500

600

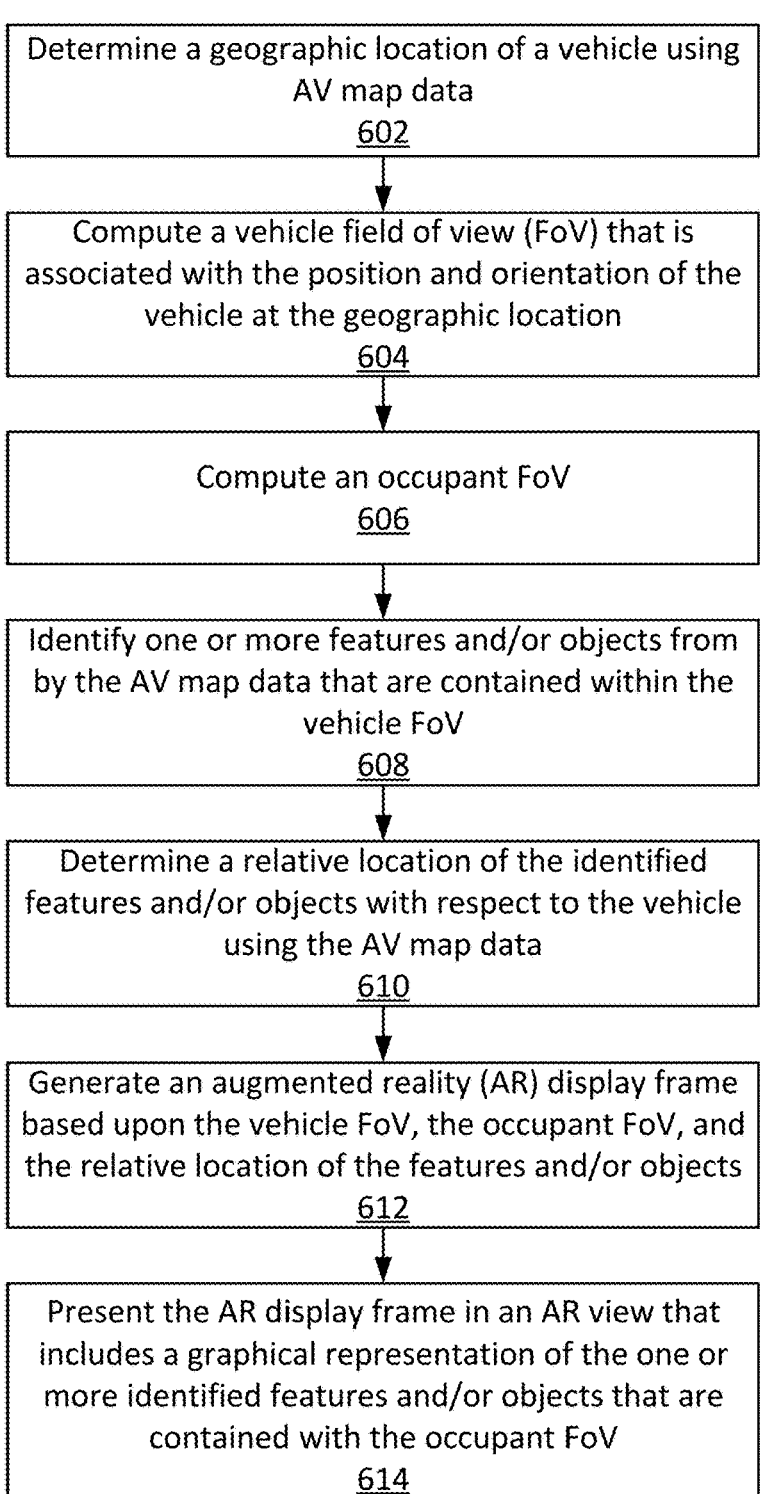

Determine a geographic location of a vehicle using AV map data
602

Compute a vehicle field of view (FoV) that is associated with the position and orientation of the vehicle at the geographic location
604

Compute an occupant FoV
606

Identify one or more features and/or objects from by the AV map data that are contained within the vehicle FoV
608

Determine a relative location of the identified features and/or objects with respect to the vehicle using the AV map data
610

Generate an augmented reality (AR) display frame based upon the vehicle FoV, the occupant FoV, and the relative location of the features and/or objects
612

Present the AR display frame in an AR view that includes a graphical representation of the one or more identified features and/or objects that are contained with the occupant FoV
614

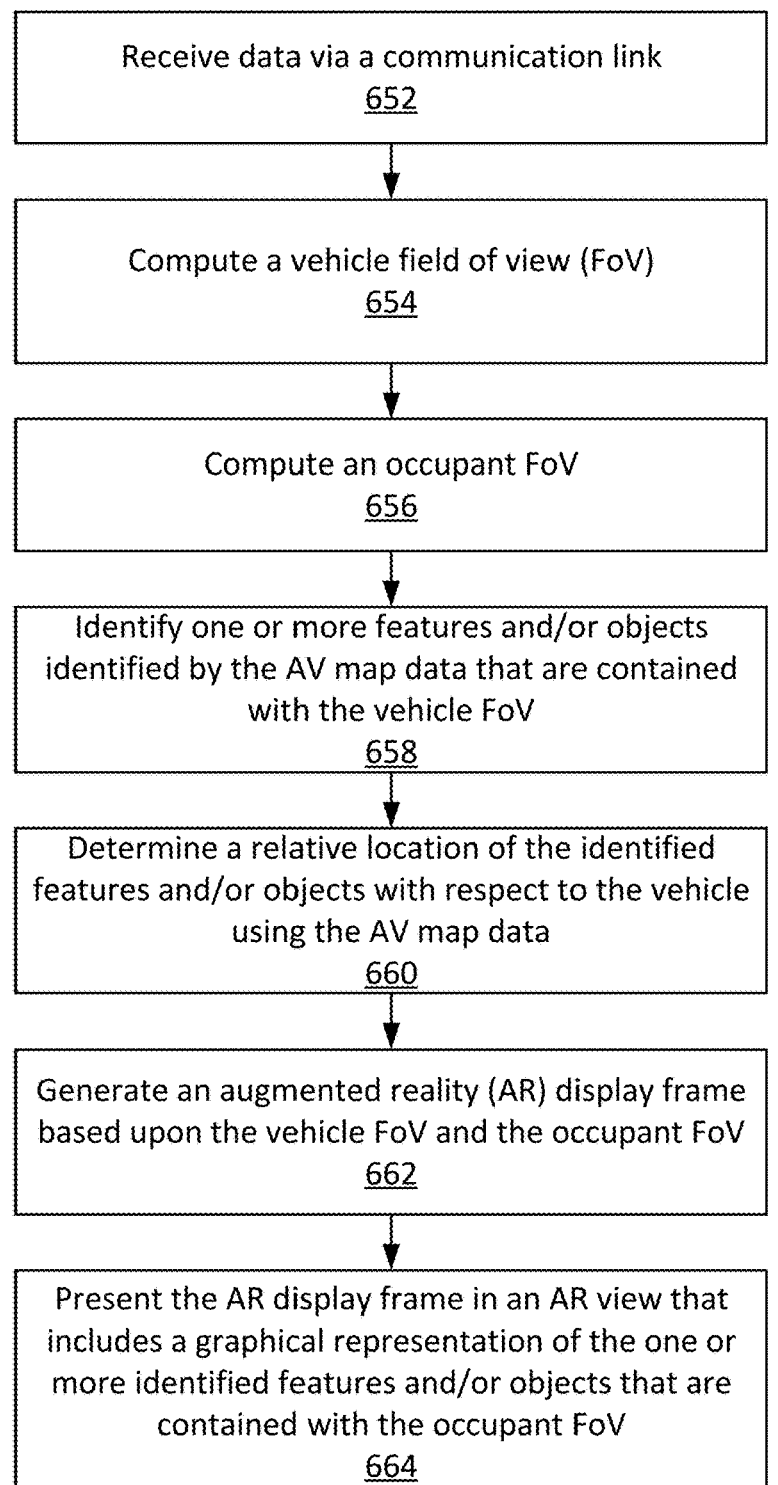

Receive data via a communication link
652

Compute a vehicle field of view (FoV)
654

Compute an occupant FoV
656

Identify one or more features and/or objects identified by the AV map data that are contained with the vehicle FoV
658

Determine a relative location of the identified features and/or objects with respect to the vehicle using the AV map data
660

Generate an augmented reality (AR) display frame based upon the vehicle FoV and the occupant FoV
662

Present the AR display frame in an AR view that includes a graphical representation of the one or more identified features and/or objects that are contained with the occupant FoV
664

MAP FEATURES DELIVERED VIA AUGMENTED REALITY (AR)

CROSS-REFERENCE TO RELATED APPLICATIONS

This application is a continuation of U.S. patent application Ser. No. 17/997,669, filed on Nov. 1, 2022, which is a national stage entry of PCT application no. PCT/IB2022/058631, filed Sep. 13, 2022, which claims the benefit of and priority to U.S. provisional application No. 63/243,484, filed Sep. 13, 2021, the contents of each of which are incorporated herein by reference in their entireties.

TECHNICAL FIELD

Aspects described herein generally relate to techniques for presenting graphical representations via augmented reality (AR) and, in particular, to presenting graphical representations in an AR view of road maps, features, and other information to an occupant of a vehicle.

BACKGROUND

Road Experience Management (REM) is a technology directed to delivering Roadbook map features using crowd-sourced data. Roadbook map features are powered by REM technology and function, in combination with other technologies, to enable the deployment of autonomous vehicles (AVs) in new locations nearly instantaneously. The Roadbook Map is produced independently of third-party mapping utilities and relies instead on specific mapping features. Unlike conventional static maps, a Roadbook Map encompasses a dynamic history of how drivers drive on any given stretch of road to better inform the AV's decision-making process. Current systems using Roadbook Map delivery utilize conventional in-vehicle displays/Conventional displays do not consider a driver's specific field of view (FoV) when presenting information.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 6A illustrates an example process flow for the use of windshield projection techniques for presenting AR display frames, in accordance with one or more aspects of the present disclosure;

FIG. 6B illustrates an example process flow for the use of AR device projection techniques for presenting AR display frames, in accordance with one or more aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
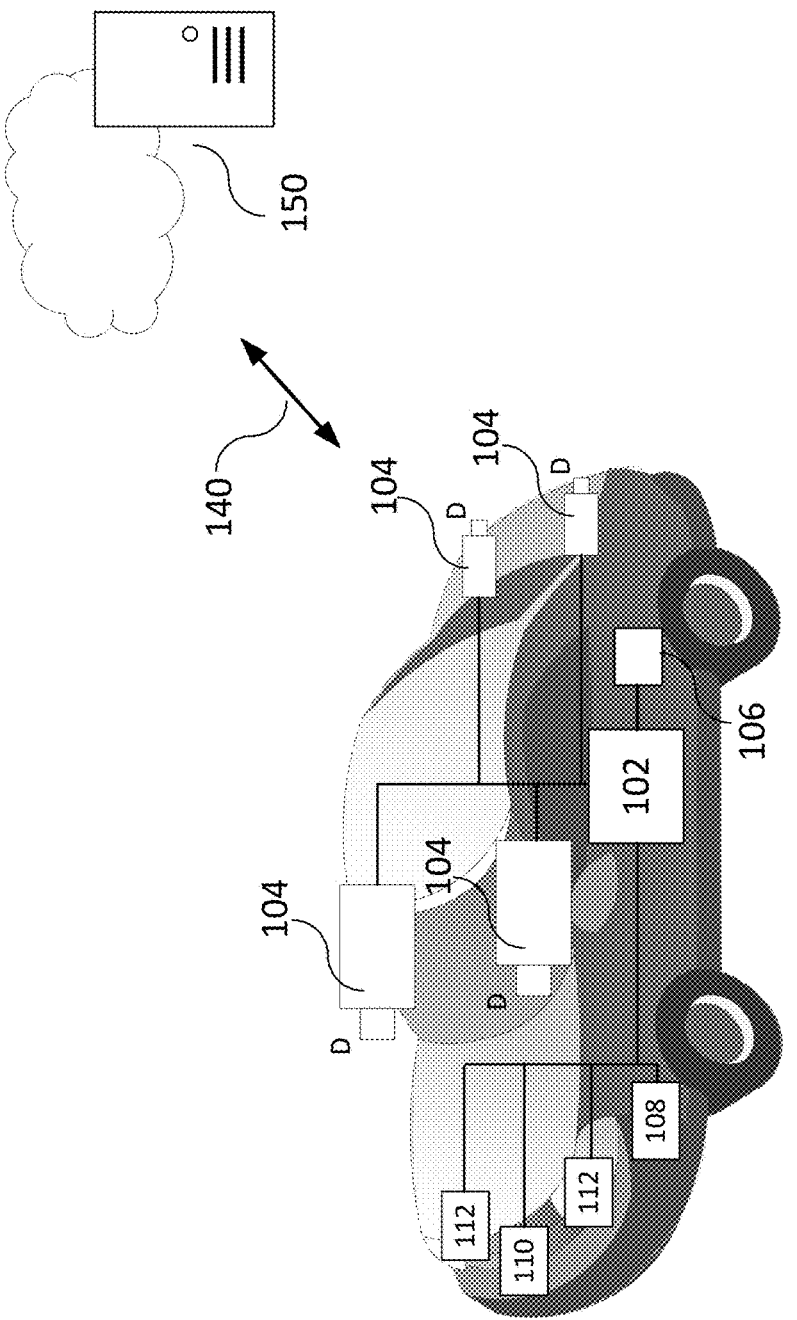
FIG. 1 illustrates an exemplary vehicle in accordance with one or more aspects of the present disclosure.

FIG. 1 illustrates a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or an advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle 100's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementations within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
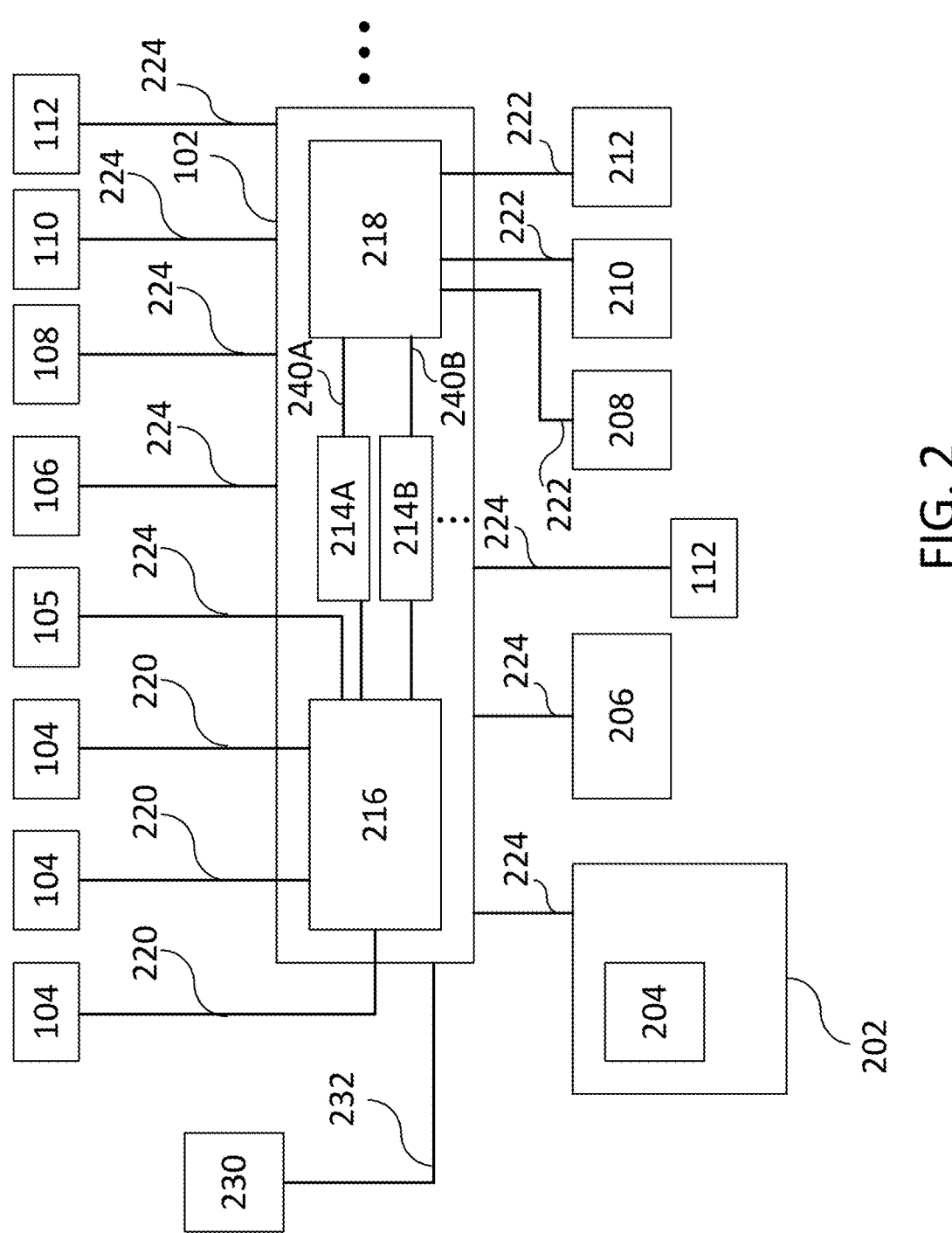
FIG. 2 illustrates various exemplary electronic components of a safety system of a vehicle in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. Additionally or alternatively, the one or more user interfaces 206 may be identified with other components in communication with the safety system 200, such as an AR device and/or an external computing device such as a mobile phone, as further discussed herein.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices 150 via one or more wireless links 140. This may include, for instance, communications with a remote server or other suitable computing system as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or portion of an advanced driver-assistance system (ADAS).

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors may thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any suitable wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example. Of course, the application processors 214A, 214B may perform other functions in addition to or as an alternative to control-based functions, such as the image processing functions discussed herein, providing warnings regarding possible collisions, etc.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232 which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc.

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with any of the aspects described in further detail below. This may include, for example, identifying relevant objects and features that are to be displayed via an AR display, which may include the use of the interface 206 or any other suitable display device for this purpose.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions. Again, such a controller or system may be configured to execute the various to perform functions related to displaying features, objects, or other information obtained from the Roadbook Map data as part of an AR display, as discussed in further detail herein, to the control of the state of the vehicle in which the safety system 200 is implemented, etc.

In some aspects, the safety system 200 may further include components such as a speed sensor 108 (e.g. a speedometer) for measuring a speed of the vehicle 100. The safety system 200 may also include one or more inertial measurement unit (IMU) sensors such as e.g. accelerometers, magnetometers, and/or gyroscopes (either single axis or multiaxis) for measuring accelerations of the vehicle 100 along one or more axes, and additionally or alternatively one or more gyro sensors, which may be implemented for instance to calculate the vehicle's ego-motion as discussed herein, alone or in combination with other suitable vehicle sensors. These IMU sensors may, for example, be part of the position sensors 105 as discussed herein. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

Safety Driving Model

The safety system 200 may implement a safety driving model or SDM (also referred to as a "driving policy model," "driving policy," or simply as a "driving model"), e.g., which may be utilized and/or executed as part of the ADAS or AV system as discussed herein. By way of example, the safety system 200 may include (e.g. as part of the driving policy) a computer implementation of a formal model such as a safety driving model. A safety driving model may include an implementation in digital computer hardware of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable operations as further discussed herein. This navigation may optionally include adjusting one or more SDM parameters, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. The vehicle 100 may utilize the environmental model to perform various navigation-related operations within the framework of the driving policy model.

Thus, the environmental data measurements may be referenced by the safety system 200 in accordance with the SDM parameters to estimate or predict dangerous situations and, in response, perform an action such as a change in the navigational-related operation of the vehicle, issuing a warning, etc. For example, the safety system 200 may predict a dangerous situation based upon the current position, orientation, speed, heading, etc. of the vehicle 100 indicating that a collision will occur within a predefined future time period unless additional intervening action is taken. As another example, a dangerous situation may be estimated based upon one or more SDM parameters (e.g. minimum longitudinal distance, minimum lateral distance, etc.) being temporarily altered to less than their threshold minimum (or maximum) values due to the action of another driver, cyclist, etc. As part of this process, the safety system 200 may identify the location of hazards relative to the position and orientation of the vehicle 100 that are identified with the estimated or predicted dangerous situation, as well as a trajectory or other control-based functions to execute to avoid or at least mitigate the occurrence of the dangerous situation.

Navigation-related operations may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular driving scenario. The navigation-related operations may thus cause the vehicle 100 to execute a specific action based upon the environmental model to comply with the SDM parameters defined by the SDM model as discussed herein. For instance, navigation-related operations may include steering the vehicle 100, changing an acceleration and/or velocity of the vehicle 100, executing predetermined trajectory maneuvers, etc. In other words, the environmental model may be generated using acquired sensor data, and the applicable driving policy model may then be applied together with the environmental model to determine a navigation-related operation or other action (e.g. issuing a warning) to be performed by the vehicle.

Autonomous Vehicle (AV) Map Data and Road Experience Management (REM)

Data referred to as REM map data (or alternatively as roadbook map data or AV map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. It is noted that although referred to herein as "AV map data," the data may be implemented in any suitable vehicle platform, which may include vehicles having any suitable level of automation (e.g. levels 0-5), as noted above.

Regardless of where the REM map data is stored and/or accessed, the AV map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowdsourcing"). Thus, each landmark may be correlated to a set of predetermined geographic coordinates that has already been established. Therefore, in addition to the use of location-based sensors such as GNSS, the database of landmarks provided by the REM map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, and as noted above, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its geographic location and position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the AV map data is generally constructed as part of a series of steps, which may involve any suitable number of vehicles that opt into the data collection process. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the REM data. This information is then compiled into a "Roadbook Map," which constitutes a bank of driving paths, semantic road information such as features and objects, and aggregated driving behavior.

A map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the AV map data, which includes data relating to the position, in a reference coordinate system, of various landmarks such as objects and other items of information, including roads, water features, geographic features, businesses, points of interest, restaurants, gas stations, etc.

The map database 204 may thus store, as part of the AV map data, not only the locations of such landmarks, but also descriptors relating to those landmarks, including, for example, names associated with any of the stored features, and may also store information relating to details of the items such as a precise position and orientation of items. In some cases, the AV map data may store a sparse data model including polynomial representations of certain road features (e.g., lane markings) or target trajectories for the vehicle 100. The AV map data may also include stored representations of various recognized landmarks that may be provided to determine or update a known position of the vehicle 100 with respect to a target trajectory. The landmark representations may include data fields such as landmark type, landmark location, etc., among other potential identifiers. The AV map data may also include non-semantic features including point clouds of certain objects or features in the environment, and feature point and descriptors.

The map database 204 may be augmented with data in addition to the AV map data, and/or the map database 204 and/or the AV map data may reside partially or entirely as part of the remote computing system 150. As discussed herein, the location of known landmarks and map database information, which may be stored in the map database 204 and/or the remote computing system 150, may form what is referred to herein as "AV map data," "REM map data," or "Roadbook Map data." The one or more processors 102 may process sensory information (such as images, radar signals, depth information from LIDAR or stereo processing of two or more images) of the environment of the vehicle 100 together with position information, such as GPS coordinates, the vehicle's ego-motion, etc., to determine a current location, position, and/or orientation of the vehicle 100 relative to the known landmarks by using information contained in the AV map. The determination of the vehicle's location may thus be refined in this manner. Certain aspects of this technology may additionally or alternatively be included in a localization technology such as a mapping and routing model.

The aspects described herein further leverage the use of the REM map data to identify road features and objects as noted above, and optionally other types of information as noted herein, to enhance driving safety and convenience by selectively displaying such features and objects to a user (e.g. an occupant of the vehicle such as the driver or, alternatively, another passenger). Again, the AV map data may be stored in any suitable location and may be downloaded and stored locally as part of the map database 204, which may be stored as part of the one or more memories 202 or accessed via the computing system 150 via the link(s) 140, for instance.

Moreover, the AV map data as discussed herein is described primarily with respect to the use of geographic locations of known landmarks and other types of information that may be identified with those landmarks. However, this is by way of example and not limitation, and the AV map may be identified with any suitable content that can be linked to an accurate geographic location. In this way, the presentation of graphical representations of various features, objects, and other information as further discussed herein, which utilize localization and vehicle and user FoV tracking, may include third party content or other suitable content that may comprise part of the AV map data.

Using AV Map Data for the Selective Presentation of Road Objects and Features

As noted above, the AV map data may be utilized by the safety system 200 to track the geographic location of the vehicle 100 with respect to identified landmarks. Thus, the AV map data may be utilized by the safety system 200 determine the location of the vehicle 100 on the road with high accuracy. Moreover, the ego-motion of the vehicle may leverage sensor data as noted above to further determine the position and orientation of the vehicle 100 corresponding to the determined location. The aspects as described herein leverage the use of the safety system 200 and the AV map data to selectively present various graphical representations, e.g. objects and features, for a user, within an augmented reality (AR) view. For example, the aspects as described herein may present, on a display (e.g. projected onto the vehicle windshield or a wearable device), populated graphical representations (i.e. graphical elements) representative of any suitable type of information that may be obtained from the AV map data and, additionally or alternatively, any other suitable data sources as further discussed herein. This may include, for example, the presentation of features and/or objects obtained via the AV map data and, additionally or alternatively, other features and/or objects based upon sensor data, the state of the vehicle 100, etc., as further discussed herein.

To do so, the aspects as described herein may be used in accordance with any suitable type of device that is capable of providing an AR view for a user. For instance, the one or more user interfaces 206 as shown in FIG. 2 may include an in-vehicle display, which may include a heads up vehicle display that is used to selectively project a graphical representation of road objects and features as discussed herein within an AR view, as shown for example in FIG. 3. This may be implemented, for instance, via the use of a projector (which may form part of the one or more user interfaces 206) or other suitable display technologies that enable a graphical representation of road objects and features to be presented within an inner surface of a windshield of the vehicle 100.

As further discussed below, aspects include processing data, rendering, and selectively presenting the graphical representation within a user's FoV such that the graphical representations are aligned with respect to the viewpoint (i.e. focus) of the user. The user may be an occupant of the vehicle 100, e.g. the driver of the vehicle 100 or another user, such as a person wearing AR glasses (including the driver or other occupant of the vehicle 100), a motorcycle driver wearing a motorcycle helmet that implements a helmet visor display, etc., as further noted herein. Regardless of the particular user, the presentation of the graphical representations within the detected FoV may be accomplished by the one or more processors 102 first localizing the vehicle using the AV map data, which includes landmarks and corresponding predetermined geographic locations. This may be achieved in accordance with any suitable techniques, such as the determination of the geographic location of the vehicle 100 using location-based sensors such as GNSS, and the determination of the position and orientation of the vehicle using the vehicle ego-motion, as described herein. As further discussed further below, this information may then be used to calculate a vehicle field of view (FoV), which corresponds to the front the vehicle and spans any suitable three-dimensional angular range based upon the position and orientation of the vehicle 100 at a particular geographic location.

Next, a field of view (FoV) for the vehicle occupant is calculated, which may be performed in any suitable manner using any suitable type of image or other sensor-based analyses. For instance, the one or more processors 102 may utilize image data acquired from the one or more image acquisition devices 104 (which may include cabin-facing cameras) to detect the driver's head and eye position and orientation in three-dimensional space, from which the user's head and eye position with respect to the AR view projection surface (e.g. the windshield), as well as the gaze direction, may be determined (e.g. by localizing the user's pupils). Additionally or alternatively, the user's head and eye position and orientation may be identified from any other suitable type of sensors, such as sensors described herein with respect to the one or more sensors 105, for instance.

It is noted that the graphical representations of the features and objects derived from the AV map data, and additionally or alternatively any other suitable icons, features, objects, etc., may be presented as part of an AR view in accordance with the aspects described herein in different ways. As discussed herein, the term "graphical representations" encompasses any suitable type of visual information that may be presented as part of an AR view, not including the "real-world" objects or features that may otherwise exist. One example of the presentation of the AR view is with respect to the windshield of the vehicle 100 (i.e. "windshield projection embodiments"). As another example, the AR device 301 may comprise any suitable display configured to present an AR view to its wearer (i.e. "AR device projection embodiments"). Thus, each of these aspects may facilitate the presentation of any suitable type of graphical representations in an AR view, but may differ with respect to the manner in which the occupant FoV is tracked and the graphical representations are selectively presented within the occupant FoV.

Moreover, in both the windshield and the AR device projection embodiments, the AR view may comprise any suitable number of AR display frames, each being sequentially presented over time to track changes in the relative motion of the features and objects with respect to the occupant's FoV. Thus, each AV display frame may contain graphical representations that are aligned with respect to the occupant's current FoV at that same time. In both the windshield and the AR device projection embodiments, the location and position of the graphical representations within the AR view may be determined, at least initially, based upon the vehicle FoV. Again, the vehicle FoV may be computed via the ego-motion of the vehicle, and may be identified with any suitable angular FoV directed towards the front of the vehicle based upon its current geographic location, position, and orientation on the road.

In other words, because the ego-motion of the vehicle indicates the position and orientation of the vehicle 100, the safety system 200 may therefore identify one or more features and objects included in the AV map data that are contained within the vehicle FoV based upon the vehicle ego-motion. Moreover, because the geographic location of the vehicle 100 is also known, the safety system 200 may also determine the relative location of the identified features and objects with respect to the geographic location of the vehicle using the AV map data. Finally, once the features and objects and their relative positions with respect to the vehicle 100 are determined, the safety system 200 may generate an AR display frame by filtering the identified features and objects contained within the vehicle FoV to present those that are contained within the occupant's FoV. In other words, the safety system 200 generates the AV display frame based upon the geographic location of the vehicle, the identified FoV of the occupant of the vehicle, and the relative location of the identified one or more features and objects with respect to the vehicle 100. In this way, as the position and orientation of the vehicle changes as indicated by the vehicle ego-motion, the graphical representations within the occupant's FoV are also updated to reflect new features and objects, features and objects moving out of the occupant's FoV, as well as the movement of the features and objects within the occupant's FoV. Thus, each AR display frame presented in the AR view may comprise, for instance, a graphical representation associated with the one or more identified features and objects that are contained within the occupant's FoV at a particular time.

Thus, for the windshield projection embodiments, the sensor(s) 105 may be used to determine the occupant FoV. That is, the sensors (s) 105 may be used to determine the occupant FoV as part of the calculations performed by one or more components of the safety system 200, such as the processor(s) 102 for instance. The occupant FoV computed in this manner is then used to project the graphical representations onto the vehicle windshield of the vehicle 100. In this way, the position and pose of the occupant's head with respect to the other in-cabin components (e.g. the windshield) may be tracked via the acquired sensor data and/or image processing techniques such that the occupant's FoV may also be tracked over time. In accordance with the windshield projection embodiments, the occupant's FoV may be used, for example, to identify a smaller portion of the windshield over which to project the graphical representations within the AR view. Furthermore, in accordance with the windshield projection embodiments, the occupant FoV may be used to determine the location on the windshield to project the graphical representations such that the graphical representations are aligned with the user's focus. That is, without accounting for the occupant's FoV in this way, the AR display frame would remain unchanged as the occupant shifts position with respect to the distance between the user's eyes and the projection surface, resulting in a potential misalignment of the graphical representations. Thus, as the position and orientation of the vehicle and the occupant change, the use of the occupant FoV in this manner allows for the graphical representations that are contained within the occupant's FoV to be updated in each of the AR display frames. In this way, the graphical representations are overlaid at corresponding locations, relative to the FoV of the occupant of the vehicle, where the associated physical objects, physical features, etc. physically reside. An example of a single AR display frame generated in accordance with such embodiments is shown in FIG. 3 projected on the windshield inside the cabin of the vehicle 100.

However, for the AR device projection embodiments (such as AR glasses, a helmet with an AR visor, etc.), the AR device may additionally or alternatively implement one or more sensors and/or processing circuitry to enable tracking of user's head position and pose to facilitate tracking the occupant's FoV in this manner. An example of such a system is shown in FIG. 3, which illustrates an (optional) AR device 301 inside of the vehicle 100, and which implements the one or more processors 102 as discussed above as part of the safety system 200. Although shown in FIG. 3 as being inside a vehicle, this is by way of example and not limitation, and the AR device 301 may be implemented as any suitable type of AR device as discussed herein, which may include AR glasses worn by the driver of the vehicle 100 (or another occupant), an integrated AR device manufactured with the vehicle 100, an aftermarket AR device installed in the vehicle 100, a motorcycle helmet visor, etc.

Figure 3:
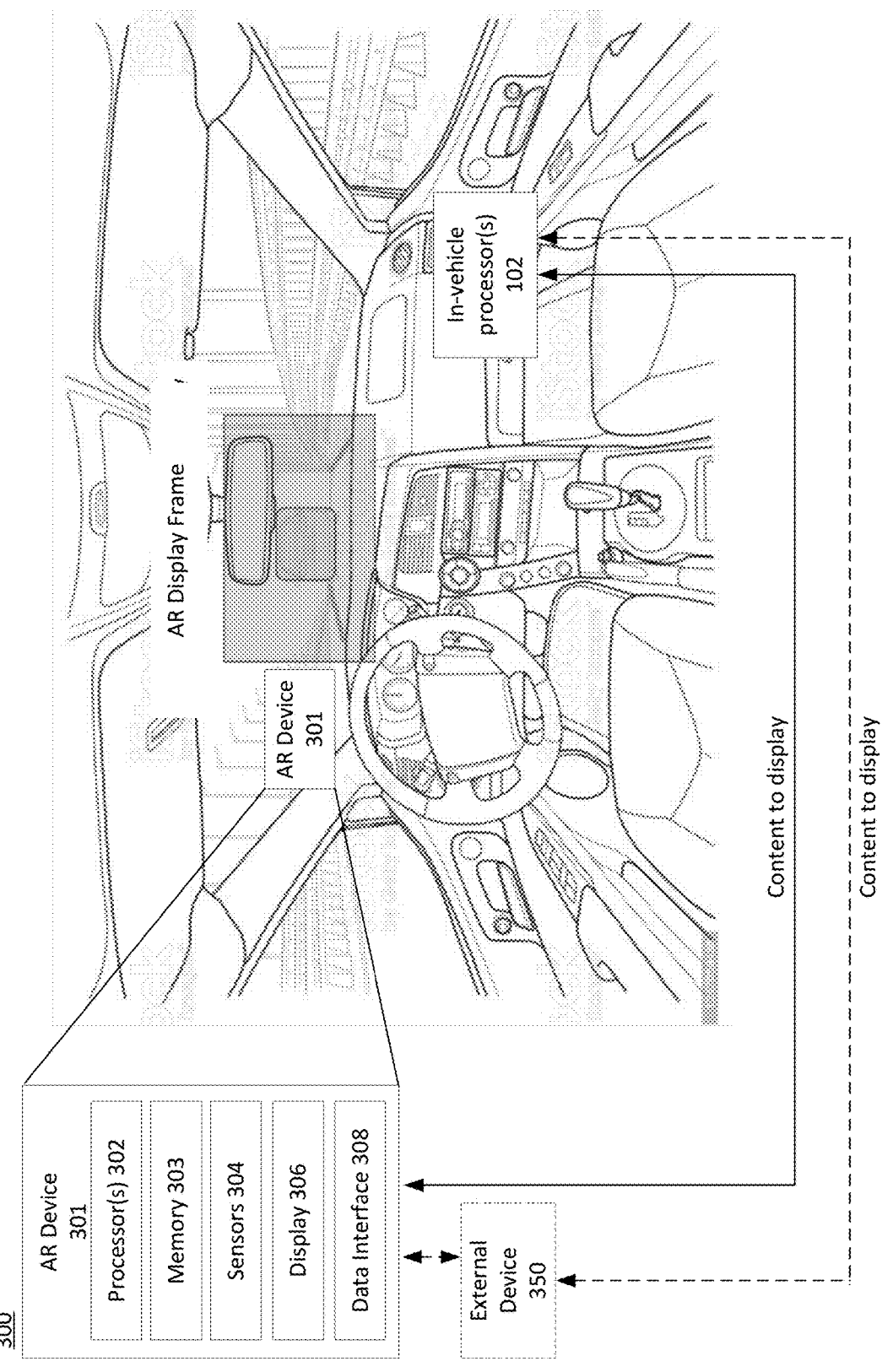
FIG. 3 illustrates a block diagram of an exemplary system that includes an AR device, in accordance with one or more aspects of the present disclosure.

With continued reference to FIG. 3, the AR device 301 may include any suitable type of hardware and/or software to enable the projection of graphical representations onto the appropriate medium (e.g. the windshield, a motorcycle helmet visor, an AR visor, AR glasses, etc.) as discussed herein. For instance, the AR device 301 may implement one or more processors 302, which may comprise any suitable number and/or type of processor or processing circuitry. In various aspects, the processors 302 may be configured as any suitable number and/or type of computer processors, which may function to control the AR device 301 and/or components of the AR device 301. The processors 302 may be identified with one or more processors (or suitable portions thereof) implemented by the AR device 301. For example, the processors 302 may be identified with one or more processors such as a host processor, a digital signal processor, one or more microprocessors, graphics processors, microcontrollers, an application-specific integrated circuit (ASIC), part (or the entirety of) a field-programmable gate array (FPGA), etc.

In any event, aspects include the processors 302 being configured to carry out instructions to perform arithmetical, logical, and/or input/output (I/O) operations, and/or to control the operation of one or more components of AR device 301 to perform various functions associated with the aspects as described herein. For example, the processors 302 may include one or more microprocessor cores, memory registers, buffers, clocks, etc., and may generate electronic control signals associated with the components of the AR device 301 to control and/or modify the operation of these components. For example, aspects include the processors 302 communicating with and/or controlling functions associated with the memory 303, the sensors 304, the display 306, and/or the data interface 308. The processors 302 may additionally perform various operations as discussed herein with reference to the one or more processors of the safety system 200 identified with the vehicle 100 to selectively present graphical representations derived from the AV data (or other data source as noted herein) in an AR view.

The memory 303 is configured to store data and/or instructions such that, when the instructions are executed by the processors 302, cause the AR device 301 to perform the various functions as described herein. The memory 303 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 303 may be non-removable, removable, or a combination of both. For example, the memory 303 may be implemented as a non-transitory computer readable medium storing one or more executable instructions such as, for example, logic, algorithms, code, etc.

As further discussed herein, the instructions, logic, code, etc., stored in the memory 303 may enable the aspects disclosed herein to be functionally realized. Thus, aspects include the processors 302 executing the instructions stored in the memory 303 in conjunction with one or more hardware components to perform the various functions associated with the aspects as further discussed herein.

The sensors 304 may be implemented as any suitable number and/or type of sensors configured to track the position and orientation of the AR device 301, and thus a user wearing the AR device 301, relative to the motion of the vehicle 100. Thus, the sensors 304 may be configured to perform tracking of the position and orientation between the AR device 301 and the specific surface or location within the vehicle 100 upon which the AR display is to be presented. To do so, the one or more sensors 304 may include GPS, inertial measurement unit (IMU) sensors such as accelerometers, magnetometers, and/or gyroscopes, cameras, depth sensors, etc. Thus, when the AR device 301 is used inside the vehicle 100, the relative position and orientation between the AR device 301 and the presentation plane within the vehicle 100 may be determined by using any suitable type of tracking and localization techniques. Moreover, the ego-motion of the vehicle 100 may be used to "filter out" the vehicle motion from the user's head motion in this way, as the position and orientation of the occupant's head and vehicle are each tracked.

The AR device sensors 304 may thus generate sensor data indicative of the position and orientation of the AR device 301 in three-dimensional space relative to the various in-vehicle components. As further discussed herein, the AR device 301 may also receive data from the safety system 200 indicative of the ego-motion of the vehicle 100. The processors 302 may thus use each set of data using any suitable techniques, including known techniques, to calculate the relative motion between the AR device 301 and the vehicle 100 to thus filter out the motion of the vehicle 100. In this way, the AR device 301 may determine where a wearer (e.g. a vehicle driver or other occupant) is looking and the relevant user FOV to display content. This tracking may be provided by a manufacturer of the AR device 301 (e.g. an AR glasses manufacturer), and thus tools provided by the AR device 301 manufacturer may be leveraged for this purpose. Alternatively, the external device 350 and/or the vehicle processor(s) 102 may receive the sensor data from the AR device 301 and perform these tracking and filtering operations using any suitable techniques.

As an illustrative example, the AR device 301 may use the sensor data generated by the sensors 304 to perform tracking and localization of a wearer, which may include the identification of anchor objects. Anchor objects in this context may include, for instance, predefined objects or objects that are dynamically detected for this purpose. As some examples, anchor objects may include parts of the vehicle 100, predefined markers, or any other suitable object that is located inside or outside the vehicle 100. The anchor objects may be identified with recognizable objects, and the processor(s) 302 (which again may be implemented via the AR device 301 or the external device 350) and/or the in-vehicle processors 102, may calculate a relative position and orientation between the AR device 301 and the vehicle 100 using a calculated relative position of the anchor objects with respect to the AR device 301 and the vehicle 100, as well as the ego-motion of the vehicle 100, which may be received by the AR device 301 via compunctions with the safety system 200 as discussed herein.

The AR device 301 also includes a display 306, which may be implemented as any suitable type of display depending upon the particular implementation of the AR device 301, and is configured to render the AR display frames for the wearer in an AR view. For instance, the AR device 301 may be implemented as a wearable headset, and thus the display 306 may be implemented as the display device used in accordance with such a headset. Additional examples of the display 306 may include a visor, part of a motorcycle helmet, etc.

The AR device 301 further includes a data interface 308, which is configured to enable communications between the AR device 301, the safety system 200 (e.g. wireless transceivers 208, 210, 212) or other components of the vehicle 100, and/or the external device 350. Thus, the data interface 308 may be implemented as one or more transceivers, receivers, transmitters, communication interfaces, etc. The data interface 308 is thus implemented as any suitable number and/or type of components configured to transmit and/or receive data and/or wireless signals in accordance with any suitable number and/or type of communication protocols. The data interface 308 may include any suitable type of components to facilitate this functionality, including components associated with known transceiver, transmitter, and/or receiver operation, configurations, and implementations. For example, the data interface 308 may include components typically identified with an RF front end and include, for example, antennas, power amplifiers (PAs), RF filters, mixers, local oscillators (LOs), low noise amplifiers (LNAs), upconverters, downconverters, channel tuners, etc. Additionally or alternatively, the data interface 308 may comprise any suitable number and/or type of components configured to enable the transfer of data between a wireless link and the AR device 301, such as e.g. ports, modulators, demodulators, buffers, drivers, memory, etc.

The external device 350 as shown in FIG. 3 is optional and, when present, may be implemented with similar or identical components as the AR device 301. Alternatively, the external device 350 may be implemented with a subset of components as shown and described herein with reference to the AR device 301. The AR device 301 and the external device 350 may each implement respective components to work in conjunction with one another to facilitate the embodiments as discussed herein. For example, the external device 350 may be implemented as a mobile device and/or may implement one or more processors similar to the processor(s) 302 of the AR device 301, as discussed in further detail herein. In accordance with such an arrangement, the AR device 301 may offload processing functionality, which would otherwise be performed via the processor(s) 302 as discussed herein, to the external device 350 and/or to the safety system 200. Thus, the AR device 301 may implement the processor(s) 302 to perform processing operations or, alternatively, the external device 350 may perform these processing operations. In any event, the AR device 301, the various components of the vehicle safety system 200 (e.g. the one or more wireless transceivers 208, 210, 212, etc.), and the external device 350 (when present) may be communicatively coupled to one another via any suitable number of wireless links such that the AR device 301 and/or the external device 350, as the case may be, may receive the graphical content to display as identified by safety system 200 or locally identified, as further discussed herein.

Additionally or alternatively, the offloaded processing performed via the external device 350 may be offloaded to the safety system 200. To support this functionality, the AR device 301, the external device 350, and/or the safety system 200 may communicate with one another uni-directionally or bi-directionally, in various embodiments, via any suitable number and/or type of wireless links. For instance, the AR device 301 may transmit sensor data and/or other suitable type of data to the external device 350 and/or the safety system 200. The AR device 301 and/or the external device 350 may additionally or alternatively receive any suitable type of information from the safety system 200, such as the AV map data and/or data indicative of the ego-motion of the vehicle 100, which may be used to define the user's FoV as discussed herein. Again, this may be the case, for instance, when such processing operations are not performed integrally in the AR device 301.

Regardless of the particular device that is implemented, the identified location and orientation of the user's head and eyes with known geometries (e.g. the seat position, the distance from the user's eyes to the display (e.g. the windshield), etc.), may be used to calculate an angle of view that encompasses the user's FoV with respect to the current position and direction of the user's gaze. This user FoV may then be mapped or correlated with the particular geographic location of the vehicle 100 and the vehicle FoV for the geographic location, position, and orientation of the vehicle 100 to identify graphical representations from the AV map data (or other suitable data sources) that are contained within the vehicle FoV. These graphical representations may then be further selected over a range that is aligned with the user's FoV. It is noted that although the user FoV may be acquired for this purpose for both the windshield and AR device projection embodiments, the user's direction of gaze (i.e. the user's head pose) may not be required for the windshield projection embodiments, as the position of the user's eyes in three-dimensional space may alternatively be used to calculate the projection plane (such as the windshield). That is, for windshield-projection embodiments, the direction of the user FoV is aligned with that of the vehicle FoV, with the user FOV assumed to differ from the vehicle FoV only with respect to the distance from the windshield. Thus, this distance may be accounted for to present the graphical representations at the correct locations in the AR display frame relative to the user's FoV in that plane.

However, for AR device projection embodiments, the occupant's head position and orientation obtained from the sensor data generated via the sensors 304 may be implemented to further map the graphical representations from the vehicle FoV to the user FoV. Doing so may account, for example, for the user turning his or hear head to the side. To provide an illustrative example, the user's FoV may change if the wearer turns her head to the left, and thus the AR device 301 may update the AR display frames from being rendered in the center of the display 306 to being to be rendered on the right side of the display 306 to remain aligned with their actual position with respect to the vehicle FoV.

In other words, the spatial layout of the graphical representation of one or more road objects and features, etc. within a user's FoV is determined from the position of each feature, object, etc. relative to the user (e.g. relative to the vehicle 100 and the user's FOV relative to the projected plane or surface such as the windshield or other display based upon the particular application). Again, the position of each feature, object, etc. that is presented within each AV display frame is derived from the geographic location of the vehicle 100, the ego-motion of the vehicle, and the AV map data. The information included in the AV map data may be leveraged in this manner to identify the location of static features, objects, etc., and the localization of the vehicle 100 (and/or other device depending upon the particular implementation) relative to those feature and objects.

Thus, for both windshield-based and AR device based projection embodiments, once the vehicle FoV is identified, the relevant processors (e.g. processors 102 or processors 302) may cause the respective display to present, in an AR view, a graphical representation of the one or more identified features and objects within the user's FoV. In this way, the one or more identified features, objects, etc., within the vehicle FoV may be overlaid at their corresponding "real-world" locations relative to the user where the associated physical objects or features reside. Moreover, aspects include optionally rendering the graphical representation of the one or more identified features and objects within the user's FoV in a 3D or 3D like environment. Thus, changes in the orientation of the vehicle 100 and/or the pose of the user's head may be tracked and processed, and the 3D shape of the relevant graphical representation may be adjusted accordingly (e.g. using projective geometry).

Delay Compensation

Again, each AR display frame contains a graphical representation of various features, objects, etc., that may be derived from the AR map data or other data sources, as further discussed herein. The AR display frames thus contain graphical representations based upon the vehicle's current FoV, which are then selectively presented to align with the user's FoV. However, it is noted that the processing used to generate the AR display frames require a certain processing time, and thus a computational delay is introduced with respect to when the vehicle localization and (when present) the AR device tracking is initially performed, and when the graphical information is actually presented within the AR view. Thus, the embodiments include techniques to compensate for such delays, and may be implemented in accordance with both the windshield and AR device projection embodiments. These techniques are further discussed immediately below with respect to FIG. 4.

Figure 4:
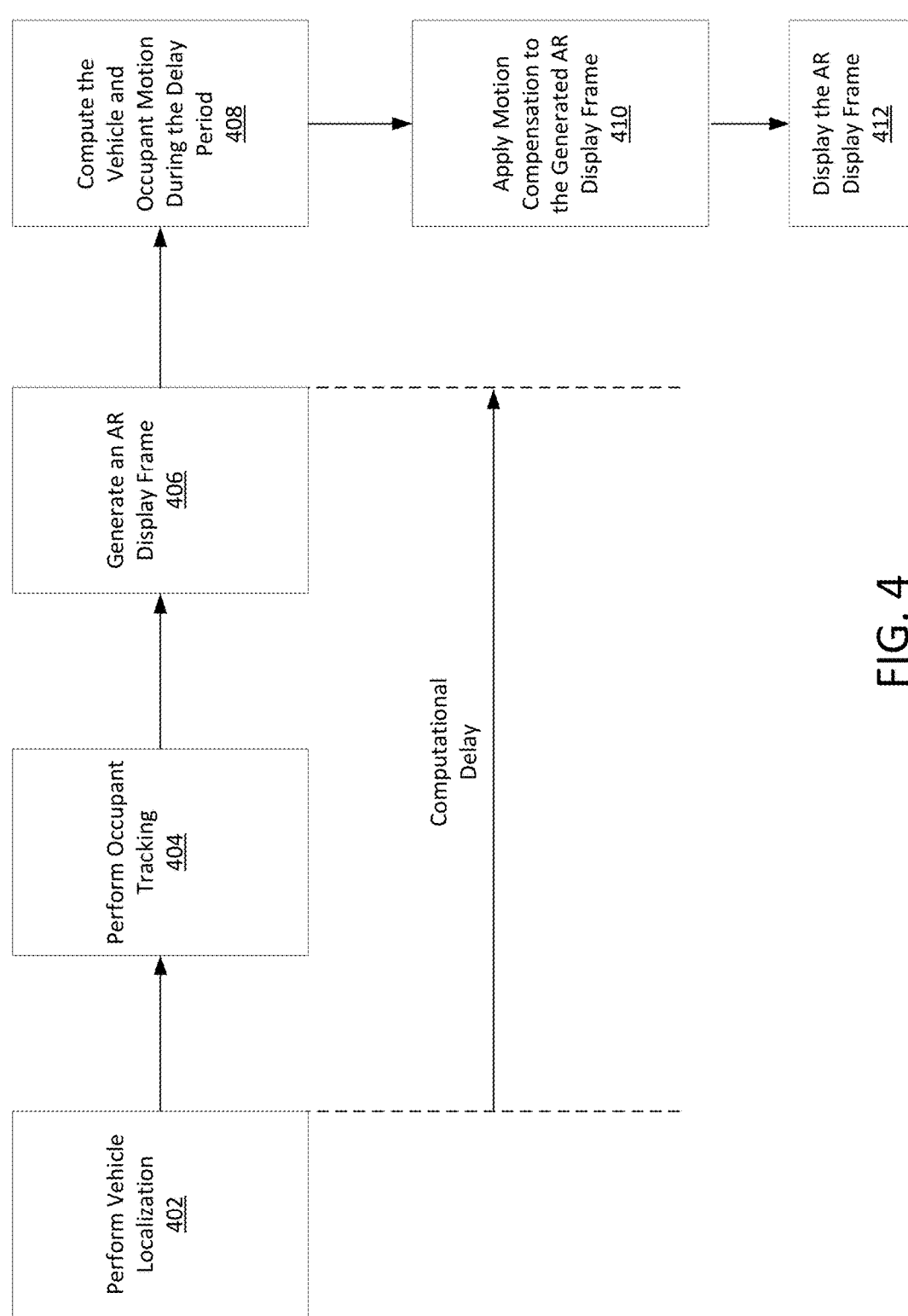
FIG. 4 illustrates a process flow of an exemplary delay compensation technique, in accordance with one or more aspects of the present disclosure of the disclosure.

FIG. 4 illustrates a process flow of an exemplary delay compensation technique, in accordance with one or more aspects of the present disclosure of the disclosure. As shown in FIG. 4, the block 402 represents the vehicle localization process. This may include the safety system 200 determining the geographic location of the vehicle 100, and then calculating the position and orientation of the vehicle 100 at this geographic location using the AV map data as part of the ego-motion calculations. Again, this may include referencing the geographic location of known landmarks relative to the location of the vehicle 100. Additionally, the ego-motion calculations may include using the position sensors 105 to identify the vehicle ego-motion as part of the localization process.

In block 404, the position and orientation of the occupant of the vehicle is calculated. For the AR device projection embodiments, this may be performed by the AR device 301 alone or in conjunction with other devices such as the external device 350. In accordance with such embodiments, this may include an analysis of the sensor data provided by the sensors 304, as noted above. For the windshield projection embodiments, the safety system 200 may calculate the position and orientation of the occupant based upon the vehicle sensors such as in-cabin cameras, for example. In any event, block 404 represents an occupant localization process in which the location and orientation of the occupant with respect to the vehicle 100 is calculated to determine the user's FoV, as noted above.

Next, an AR display frame is generated in block 406. For the AR device projection embodiments, this may be performed by the AR device 301 alone or in conjunction with other devices such as the external device 350. To do so, the applicable device (e.g. the AR device 301) may receive the position and orientation of the vehicle 100 from the safety system 200, which was computed as part of the vehicle localization calculations. The applicable device may also receive the AV map data or, alternatively, the identified graphical representations as identified via the safety system 200, and their corresponding locations mapped to the vehicle FoV. That is, the corresponding locations of the graphical representations are mapped with respect to the position and orientation of the vehicle 100. In accordance with the AR device projection embodiments, the applicable device may receive this information via a wireless communication link between the AR device 301 (or other suitable device) and the vehicle 100, as noted above.

The AR device 301 may then, in this example, determine which of the graphical representations to include in the generated AR display frame for the user's FOV, and their corresponding locations within the user's FoV. This may include, for instance, translating the location of each graphical representation within the vehicle FoV to an updated location with respect to the user's FoV. This process may utilize any suitable techniques, including known techniques, to perform this coordinate transformation based upon the vehicle and occupant localization processes and an analysis of their respective position and orientation in three-dimensional space. Thus, and as shown in FIG. 4, the computational delay represents the time between when the vehicle localization is initially performed (i.e. the position and orientation of the vehicle 100 is calculated) and when the AR display frame containing the graphical representations is generated.

For the AR device projection embodiments, this delay may be larger than for the windshield projection embodiments, as additional latency is introduced with the AR device 301 receiving data from the safety system 200 (or other suitable computing device) via the communication link. However, for both the AR device and the windshield projection embodiments, this computational delay may be computed using any suitable techniques, including known techniques. For example, the vehicle 100, safety system 200, and any components involved in the generation of the initial AR display frame, may be synchronized with or otherwise reference a global clock. This global clock may be derived, for instance, via the GNSS system or other suitable time-based components of the vehicle 100. In any event, the global clock may be used as a timestamp to identify when each computational process has been completed.

For example, a timestamp may be used to identify when the vehicle localization (block 402) has been completed, as well as when the AR display frame has been generated (block 406). Thus, using the difference between these timestamps, the safety system 200 or the applicable device (e.g. the AR device 301, the external device 350, etc.), as the case may be, may compute the computational delay. The use of timestamping in this manner may be particularly useful for implementations in which the computational delay is dynamic in nature. For other implementations in which the computational delay is known a priori, or not expected to deviate significantly over time, the computation delay may be estimated via other means, e.g. via calibration or other suitable testing process.

Regardless of how the computational delay is computed, embodiments include the use of the computational delay to compensate for the presentation of the graphical representations within the AR display frame. For instance, the computational delay may be on the order of 100 milliseconds in some cases, and the position and orientation of the vehicle 100 and the occupant's FoV may change during this computational delay period. Thus, not compensating for the computational delay may result in the graphical representations being presented in the AR view aligned with features and objects at their previous position and orientation with respect to the vehicle 100, versus their current position and orientation, and as a result be misaligned with respect to the corresponding locations of the features and objects relative to the user's current FoV.

Therefore, to address this issue, the embodiments include the computation of the vehicle and occupant motion during the computational delay period. This is performed as part of block 408 as shown in FIG. 4. For instance, in the windshield projection embodiments, the vehicle ego-motion may be computed in a continuous manner, and this data may be readily available. The ego-motion data may thus be generated and accessed with significantly less delay compared to the computational delay. Likewise, the occupant's position and orientation may be tracked via the in-cabin sensors and be available without a significant delay. Thus, the safety system 200 may track the vehicle ego-motion and the position and orientation of the occupant in parallel with the process flow as shown in FIG. 4. As a result, the position and orientation of the vehicle 100 and the occupant may be accessed with minimal latency (e.g. excepting for a small latency introduced via processing and memory retrieval steps) at the time the AR display frame is generated. Moreover, because a considerable amount of the computational delay is the result of the identification and rendering of the graphical representations to be presented in the AR view, the updated (i.e. current) position and orientation data for the vehicle 100 and the occupant may be applied (block 410) to further shift (e.g. via coordinate transformation) the relative position and orientation of each of the graphical representations to align with the actual physical locations of features, objects, etc. that are presented in the AR view.

It is noted that the AR device projection embodiments may work in a similar manner, with the exception of the applicable device (e.g. the AR device 301) receiving the ego-motion data wirelessly from the safety system 200 and locally computing the position and orientation of the occupant. Thus, in accordance with both embodiments, the motion of the vehicle and the occupant during the computational delay are utilized to compensate for changes in the position and orientation of the vehicle and occupant during the delay period. Once the motion compensation has been applied in this manner, the AR display frame is then presented (block 412) in the AR view as discussed herein.

In this way, the processing circuitry of the safety system 200 and/or the applicable device, as the case may be, is configured to compensate for changes in the position and orientation of the vehicle and user during the delay period by tracking the ego-motion of the vehicle and the position and orientation of the user's head. Thus, the vehicle FoV and the occupant FoV may be adjusted using this information to match an updated position and orientation of the vehicle and the user's head corresponding to when the AR display frame was generated.

In some windshield and AR device projection embodiments, the motion compensation may be consistently performed based upon the computational delay. However, in other windshield and AR device projection embodiments, the motion compensation due to the computational delay may be selectively performed. That is, for some embodiments the computational delay may (e.g. consistently) be less than a threshold delay value such that the difference between compensating and not compensating for the motion during the computational delay results is negligible. That is, the effect is negligible with respect to any change in the manner in which the graphical representations are presented in the AR view.

However, in other embodiments the computational delay may be monitored to determine whether to perform the motion compensation techniques discussed herein. For instance, the processing circuitry of the safety system 200 and/or the applicable device, as the case may be, may be configured to selectively compensate for changes in the position and orientation of the vehicle (and occupant) during the computational delay when this delay period exceeds a predetermined threshold time period, and to otherwise not perform the motion compensation. Moreover, it is noted that the aspects discussed herein may dynamically adapt how the computational delay is implemented, and whether the computational delay is needed, based upon the particular equipment that is used for the AR device. For instance, in the event that different AR equipment is used in a single session (e.g. first an AR windshield display is used and at some point the user switches to AR device display), the various delay parameters as further discussed herein may be adjusted accordingly. These delay parameters may include any suitable parameters that are used as part of the delay compensation techniques as discussed herein, such as e.g. a predetermined threshold value for the computation delay, image frame rate frequency, the sampling rate with respect to the sensor data acquired via the safety system 200, the AR device 301, etc.

Additionally or alternatively, the motion compensation techniques as discussed herein may function to actively reduce the computational delay in various ways. This may also be a selective process, i.e. triggered only when the computational delay exceeds a predetermined threshold value. This may include, for example, the safety system 200 adjusting one or more parameters regarding a manner in which the ego-motion of the vehicle is calculated to reduce the computational delay. Such parameters may be referred to herein as "data acquisition parameters," and may be considered one example of the aforementioned delay parameters. This may be triggered, for instance, via the safety system 200 or, for the AR device projection embodiments, via the applicable device transmitting a control signal to the safety system 200 (e.g. via the date interface 308) to indicate this change to the safety system 200.

As one illustrative example, the ego-motion may be computed via the safety system 200 in accordance with an image frame rate, e.g. when the vehicle cameras are used for this purpose. Thus, the frequency of this frame rate may be one example of the data acquisition parameters that may be adjusted in this manner. That is, the frequency of this frame rate may be further increased to reduce the delay between when the ego-motion is computed, thus further reducing the computational delay.

As another example illustrative example, the data acquisition parameters may include any suitable number, type, and/or combination of parameters identified with the wireless link between the applicable device (e.g. the AR device 301) and the safety system 200. Such parameters may include, for instance, a change in the frequency of the wireless link, a change in the communication rate provided by the wireless link, changing the communication protocol and/or the number of frequencies used. As another example illustrative example, the data acquisition parameters may include a sampling rate with respect to the sensor data acquired via the safety system 200, the AR device 301, etc.

Additional Graphical Representations Shown in the AR View

Figure 5:
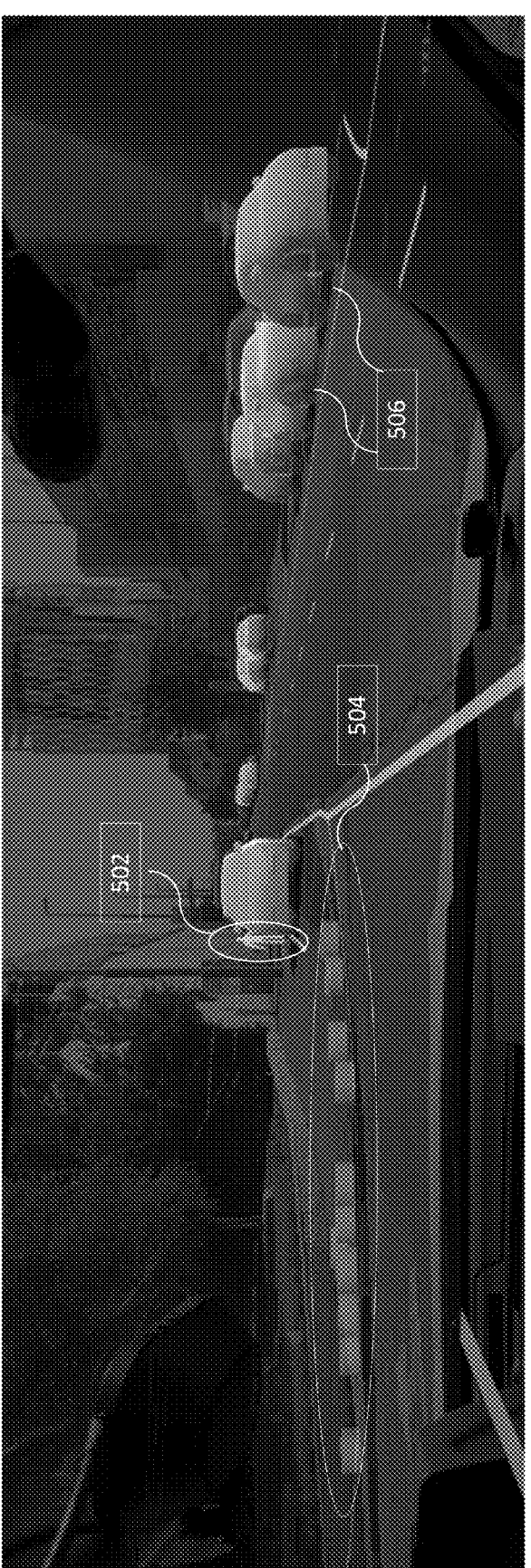
FIG. 5 illustrates an example AR display frame, in accordance with one or more aspects of the present disclosure.

FIG. 5 illustrates an example AR display frame, in accordance with one or more aspects of the present disclosure. Again, the embodiments described herein include presenting such AR frames sequentially within an AR view. The AR view, and each AR display frame that is presented within the AR view, may contain any suitable type of graphical representations that may be derived from any suitable type of data source. For instance, the examples discussed above describe the graphical representations often being presented with respect to features and objects of a road, although this is by way of example and not limitation. In fact, the embodiments described herein may present alternate or additional graphical representations within the AR view based upon the AV map data or other suitable data source.

For instance, the graphical representations that are displayed in the AR view may also comprise data that is derived from sensors identified with the vehicle 100 or other suitable device. Thus, the graphical representation of features, objects, etc., may be further enhanced with data derived from sensor measurements to display information on dynamic objects. Moreover, the graphical representations that are displayed in the AR view may further encompass other information that is neither stored in the AV map data nor derived from sensor measurements. For instance, the localization techniques as discussed herein, which again leverage the use of the AR map data, may be implemented to accurately align the displayed graphical representations of any suitable type of information to any suitable type of location-based content (e.g. interesting points along the route, advertisements, navigation information, etc.).

As an illustrative example, the safety system 200 may identify, in addition to or instead of those identified using the AV map data, one or more features and objects that are contained within the vehicle FoV that are detected via one or more vehicle sensors. This may include the safety system 200 performing object detection using sensor data from cameras as well as other sensors that may operate in a non-visible spectrum, such as LIDAR and RADAR sensors, for instance. The embodiments described herein facilitate the presentation of any suitable portion of such data computations, sensors, and/or data generated from any of the vehicle systems, which may not otherwise not be directly viewable by an occupant of the vehicle, to be presented as part of the AR view.

As another illustrative example, the AR map data may include landmarks as well as road features such as lane markers and road signs. As another example, the safety system 200 may perform various types of computations in accordance with the SDM system to identify and execute driving maneuvers autonomously or semi-autonomously. As yet another example, the safety system 200 may execute image processing and machine vision algorithms to classify objects, to identify a trajectory or maneuver, etc.

Additionally or alternatively, the AR display frames may be associated with any suitable number of AR informational layers, graphical information layers, etc., such that each AR frame may display a combination of any suitable number and/or type of graphical representations, each being derived from one or more data sources that may be the same or different than one another. For example, in addition to a view of the surroundings of the vehicle 100, the AR frame may include AR objects that are derived from navigation information that was created using the AV map data. In another example, in addition to a view of the surroundings of the vehicle 100, the AR frame may include AR objects that are derived from the SDM, such as a safety envelope around a car, a pedestrian, or a cyclist in the AR frame. Thus, each AR information layer may also have its own unique display characteristics, such as animations, color pallets, dynamic behavior, etc.

In any event, regardless of how the items identified with the graphical representations are detected, once detected, such features may be presented in an AR view in the same manner as the objects and features discussed above. That is, a graphical representation of any identified object and/or features detected via the relevant sensors may be presented in the AR view overlaid at corresponding locations, relative to the FoV of the occupant of the vehicle, i.e. where the detected physical objects and/or physical features reside. Again, such sensors may include, for instance, RADAR sensors, LIDAR sensors, cameras, etc. Thus, such embodiments may be particularly useful to enhance the driver's situational awareness by presenting information in the AR view that would otherwise not be visible to the human eye or be difficult to detect in some environmental conditions.

The specific graphical representations to be presented in the AR view may be determined using information obtained from the AV map data in combination with the sensors of the safety system 200 of the vehicle 100. This may include, for instance, determining which objects should be displayed within the user FoV based upon the current camera feed data, which may be particularly useful when the vehicle 100 uses camera feed data for autonomous driving (e.g. ADAS) functions. For example, the camera feed data of the safety system 200 may identify visible objects and then, based upon the AV map data, which objects are occluded or not visible may be identified via the safety system 200. Continuing this example, only the visible objects may be displayed in the generated AR display frame or, if relevant, a graphical representation highlighting one or more invisible objects (i.e. objects not in the camera feed but detected via other sensors) may be displayed in the AR display frame.

As one example, it may be preferable to not display road markings when the camera feed does not include the road. However, in the same scenario it may be preferable to graphically present an icon or other indication to highlight a traffic light that is not visible in the camera view. This may be achieved by identifying the location of the traffic light from the AV map data, which may be compared to the expected location of the traffic light in the camera feed.

As another example, the AV map data may include the position of a stop sign line with respect to a stop sign. The stop sign may appear in the camera feed, but the stop sign line may have faded away or otherwise not be present in the camera feed. In such a case, the AR display frame may be presented that includes a graphical representation of the stop sign line in the user's FoV such that the stop sign line aligns with the correct or "expected" location of the stop sign line in reality.

To provide additional examples, a trajectory of the vehicle 100 that is computed via the safety system 200 (e.g. as part of an ADAS), i.e. a future path of the vehicle, may be presented in an AR view in a similar manner as the graphical representations as shown in FIG. 5. With respect to the trajectory of the vehicle, it is noted that the processing circuitry of the safety system 200 is configured to identify a dangerous situation that is estimated or predicted in accordance with the applied safety driving model (SDM), as noted above. That is, as part of the autonomous functionality, the safety system 200 may typically identify such situations based upon the environment of the vehicle 100 as indicated by the vehicle sensors and the implementation of the SDM. The safety system 200 may thus generate the AR display frame (or transmit this information to the AR device 301 or another suitable device which generates the AR display frame) by adding any suitable overlaid features in the AV view with respect to such operations of the safety system 200. This may include, for instance, generating the AR display frame to include a graphical representation of a warning display feature when the dangerous situation is identified. Thus, such a warning feature may advantageously be displayed with the generated AR display frame at a location relative to the user FoV, e.g. overlaid in the AR display frame at a location associated with an estimated focus point location of the occupant of the vehicle. Moreover, such a warning feature may be presented to correspond to a location of an object that is associated with the identified dangerous situation. Such a warning feature may include, for instance, a graphical icon highlighting a vehicle on the side of the road, an icon highlighting debris in the road, etc.

As additional examples, the AR view may be leveraged to graphically display representations such as the locations of available drivable paths, buildings, parking lots, available parking spaces (determined through crowd sourcing), potholes or other hazards, road edges, road shoulders, etc.

As an additional example, users or third party providers may create, store, and/or link content to the AV map data, and the safety system 200 or other suitable device (e.g. the AR device 301) may then provide this content to a user when it is relevant (e.g. when the linked content is within the user's FoV). For instance, an external content provider may link their content to the AV map data, which may then be localized using the techniques as discussed herein and augmented in the scene corresponding to the user's FoV. As an illustrative example, a user may add the address of a friend's house she frequently visits, such that a suitable icon indicating this friend's address is subsequently displayed as a graphical representation in an AR view when it is determined that the friend's house is within the user's FoV.

Such embodiments may be particularly useful, for instance, to enable third-party providers to supplement the AV map data via an application executed on the external device 350. Thus, via the use of customized executable applications, the external device 350 may also provide data to be used for the graphical representations to be presented within the AR view. For example, such applications may provide content with respect to specific geographic locations, the graphical layout of the content to be presented or overlaid (e.g. cartoon characters, shapes, icons, etc.). This may include, for instance, the presentation of advertisements, notifications, etc. correlated to specific geographic locations.

To provide yet another example, content on moving objects in a driving scene may be displayed as graphical representations in the AR view, which may be detected and identified as part of the operation of the safety system 200. This may include dynamically-identified objects or features that are detected "on-the-fly" but not contained or otherwise identified as part of the AV map data. Thus, if a pedestrian, cyclist, safety related information, or any other suitable data is detected while driving via the safety system 200, this may be graphically presented in the AR view with a suitable representation such as a bounding box, text, line, outline, etc.

Again, the additional or alternative graphical representations presented in the AR view in this manner may thus include, for instance, identified objects such as pedestrians, an example being shown in FIG. 5 as the pedestrian 502. The graphical representations may also include identified vehicles, such as the vehicles 506 as shown in FIG. 5. Moreover, the graphical representations may include virtual overlays that correspond to a particular road feature or warning to be conveyed to a user, but do not necessarily correlate with an actual physical object, such as the boundary markers 504 as shown in FIG. 5.

Moreover, although discussed herein in the context of a vehicle, the aspects described herein are not limited to vehicular AR displays, and may be used in accordance with any suitable type of device that is capable of presenting AR views or non-AR views for a user. For instance, the graphical representation of road objects, features, or any other information as discussed herein may be displayed via the AR device 301, which may be implemented independently of the vehicle 100, e.g. as an AR glasses display, a motorcycle helmet visor AR display, etc. As additional examples, the aspects may include other types of displays such as overlays onto a navigation application interface, which may include vehicle navigation, street level walking navigation, etc. The use of a computing device that may be implemented independently of the vehicle 100 is discussed in further detail below with reference to FIG. 7.

In any event, it is noted that the use of the localization techniques as described herein facilitate an accurate "blending" of holographic information (e.g. the projected graphical representations as discussed herein) with physical objects, features, or any other suitable type of information corresponding to a geographic location within a particular scene, which are matched to the user's FoV in various environments. Conventional systems cannot achieve this level of accuracy with respect to tracking the location of the real-world objects and, as a result, are limited to only presenting information within a general position in a display (e.g. at a predetermined portion of the display such as the side, top, etc.). Due to this limitation, conventional systems cannot accurately "blend" or combine the projection of information such that the graphical representations of features, objects, etc. are aligned with or overlap with the real-world position of objects in a tracked user FoV.

Process Flows

FIG. 6A illustrates an example process flow for the use of windshield projection techniques for presenting AR display frames, in accordance with one or more aspects of the present disclosure. FIG. 6A illustrates an example overall process flow to generate AR display frames including any suitable number and/or type of graphical representations of objects, features, etc., as discussed herein. With reference to FIG. 6A, the flow 600 may be a computer-implemented method executed by and/or otherwise associated with one or more processors (processing circuitry), components, and/or storage devices. These processors, components, and/or storage devices may be associated with one or more computing components identified with the safety system 200 of the vehicle 100 as discussed herein (such as the one or more processors 102, one or more of the processors 214A, 214B, 216, 218, etc.).

The one or more processors identified as discussed herein may execute instructions stored on other computer-readable storage mediums not shown in the Figures (which may be locally-stored instructions and/or as part of the processing circuitries themselves). The flow 600 may include alternate or additional steps that are not shown in FIG. 6A for purposes of brevity, and may be performed in a different order than the steps shown in FIG. 6A.

Flow 600 may begin with one or more processors determining (block 602) a geographic location of a vehicle using AV map data. This may include, for instance, the start of the vehicle localization process as discussed herein, which may include the use of GNSS and the geographic locations of nearby landmarks or other objects in the AV map data to identify the geographic location of the vehicle on the road with high accuracy.

The process flow 600 may further include the one or more processors computing (block 604) a vehicle FoV that is associated with the position and orientation of the vehicle at the determined geographic location. This may include, for instance, the completion of the vehicle localization process performed in block 402 as discussed herein with reference to FIG. 4. For example, the vehicle FoV may be determined by correlating an angular range identified with the front of the vehicle using the orientation and position of the vehicle. Moreover, the angular range determined in this way may be further mapped to the particular geographic location of the vehicle referenced to the AV map data.

The process flow 600 may further include the one or more processors computing (block 606) an occupant FoV. This may correspond, for instance, to the user FoV of a driver or other vehicle occupant for which the AR View is to be generated. The occupant FoV may be calculated, for instance, by identifying the orientation and position of the occupant's head to determine a gaze direction. Again, this may be computed, for instance, using sensor data acquired via in-cabin cameras or other sensors, with sensor data being provided to the safety system 200 for this purpose.

The process flow 600 may further include the one or more processors identifying (block 608) one or more features and/or objects from the AV map data that are contained within the vehicle FoV. For example, because the vehicle FoV is already calculated, the objects and/or features contained within this vehicle FoV may be identified from the AV map data. For example, the angular range of the vehicle FoV may be correlated to the AV map data based upon the geographic location of the vehicle 100 to determine which objects, features, etc. from the AV map data are contained within the vehicle FoV.

The process flow 600 may further include the one or more processors determining (block 610) a relative location of the identified (block 608) features and/or objects with respect to the vehicle. This may include, for example, computing position and orientation of each identified feature, object, etc. with respect to the vehicle FoV. For example, as the geographic location of each feature, object, etc. is known from the AV map data, the safety system 200 may utilize this information to map the position and orientation of each object, feature, etc. contained with the vehicle FoV with respect to the center of the vehicle FoV or other reference point identified with the vehicle 100. In this way, each feature, object, etc., that is contained within the vehicle FoV may be localized with respect to the vehicle 100.

The process flow 600 may further include the one or more processors generating (block 612) an AR display frame based upon the vehicle FoV, the occupant FoV, and the relative locations of the identified features, objects, etc. contained within the vehicle FoV. For example, the vehicle FoV is computed based upon the geographic location of the vehicle, and the identified features and/or objects have been localized to the vehicle FoV based upon the vehicle position and orientation. Once identified and localized in this manner, the relative location of the identified one or more features and objects within the FoV may be further filtered based upon those that are also contained within the occupant FoV. The graphical representations of the features and/or objects in the generated AR display frame are thus adapted as part of this process to align with the occupant's FoV, which again may be performed as part of a three-dimensional coordinate transformation process.

The process flow 600 may further include the one or more processors causing a display to present (block 614) the AR display frame in an AR view. Again, the AR display frame includes a graphical representation of the identified features and/or objects, and may additionally or alternatively include any suitable other type of information, as discussed herein. For the process flow 600, the AR display frame may be, for instance, displayed via projection on the windshield of the vehicle 100 as shown in FIG. 3, for example.

FIG. 6B illustrates an example process flow for the use of AR device projection techniques for presenting AR display frames, in accordance with one or more aspects of the present disclosure. FIG. 6B illustrates an example overall process flow to generate AR display frames including any suitable number and/or type of graphical representations of objects, features, etc., as discussed herein. With reference to FIG. 6B, the flow 650 may be a computer-implemented method executed by and/or otherwise associated with one or more processors (processing circuitry), components, and/or storage devices. These processors, components, and/or storage devices may be associated with one or more computing components identified with an AR device (e.g. the AR device 301) another suitable computing device (e.g. the external device 350), and/or the safety system 200 of the vehicle 100 as discussed herein (such as the one or more processors 102, one or more of the processors 214A, 214B, 216, 218, etc.).

The one or more processors identified as discussed herein may execute instructions stored on other computer-readable storage mediums not shown in the Figures (which may be locally-stored instructions and/or as part of the processing circuitries themselves). The flow 650 may include alternate or additional steps that are not shown in FIG. 6B for purposes of brevity, and may be performed in a different order than the steps shown in FIG. 6B.

The blocks shown in FIG. 6B of the process flow 650 are similar to those executed as part of the process flow 600 as shown in FIG. 6A. However, because the process flow 650 is directed to the AR device projection embodiments, the process flow 650 may begin with one or more processors receiving (block 652) data via a communication link. This data may include any suitable portion of the data used to generate the AR display frame as discussed herein. For example, the data received in this manner may include the geographic location of the vehicle, the AV map data that includes landmarks and corresponding predetermined geographic locations, a position and orientation of the vehicle, graphical representations to be displayed in the AR view, etc. Thus, the data may be received from the safety system 200, other suitable components of the vehicle 100, and/or other suitable computing devices (e.g. the external device 350) and may, for instance, include data that is the result of computations performed via the safety system 200 as discussed herein and with respect to the process flow 600 for example.

The process flow 650 may further include the one or more processors computing (block 654) a vehicle FoV. This vehicle FoV may be computed by the safety system 200 as discussed above with respect to the block 604 of the process flow 600, for instance, and received as part of the data via the communication link. Alternatively, the vehicle FoV may be computed locally via the AR device 301 or other suitable device. In such a case, the position and orientation of the vehicle 100 and any other suitable data used by the safety system 200 as discussed herein to compute the vehicle FoV may be received as part of the data via the communication link and/or computed locally via the AR device 301 or other suitable computing device to facilitate the computation.

The process flow 650 may further include the one or more processors computing (block 656) an occupant FoV. This may include, for instance, the one or more processors using sensor data indicative of a position and orientation of the AR device 301 or other suitable device as discussed herein.

The process flow 650 may further include the one or more processors identifying (block 658) one or more features and/or objects from the AV map data that are contained within the vehicle FoV. The one or more features and/or objects may be computed by the safety system 200 as discussed above with respect to the block 608 of the process flow 600 for instance, and received as part of the data via the communication link. Alternatively, the one or more features and/or objects may be computed locally via the AR device 301 or other suitable device. In such a case, the AV map data, the vehicle FoV, and any other suitable data used by the safety system 200 as discussed herein to identify the one or more features and/or objects may be received as part of the data via the communication link and/or computed locally via the AR device 301 or other suitable computing device to facilitate the computation.

The process flow 650 may further include the one or more processors determining (block 660) a relative location of the identified (block 608) features and/or objects with respect to the vehicle 100. The relative location of the one or more features and/or objects may be computed by the safety system 200 as discussed above with respect to the block 610 of the process flow 600 for instance, and received as part of the data via the communication link. Alternatively, the relative location of the one or more features and/or objects may be computed locally via the AR device 301 or other suitable device. In such a case, the position and orientation of each identified feature, object, etc. with respect to the vehicle FoV, the geographic location of each feature, object, etc., and any other suitable data used by the safety system 200 as discussed herein to determine the relative location of the one or more features and/or objects may be received as part of the data via the communication link and/or computed locally via the AR device 301 or other suitable computing device to facilitate the computation.

The process flow 600 may further include the one or more processors generating (block 662) an AR display frame based upon the vehicle FoV, the occupant FoV, and the relative locations of the identified features, objects, etc. contained within the vehicle FoV. The AR display frame may be computed by the safety system 200 as discussed above with respect to the block 612 of the process flow 600, for instance, and received as part of the data via the communication link. Alternatively, the AR display frame may be computed locally via the AR device 301 or other suitable device. In such a case, any suitable data used by the safety system 200 as discussed herein to generate the AR display frame may be received as part of the data via the communication link and/or computed locally via the AR device 301 or other suitable computing device to facilitate the computation.

The process flow 650 may further include presenting (block 664) the AR display frame in an AR view. Again, the AR display frame includes a graphical representation of the identified features and/or objects, and may additionally or alternatively include any suitable other type of information, as discussed herein. For the process flow 650, the AR display frame may be, for instance, displayed via projection on a suitable surface such as a visor, motorcycle helmet, etc.

Figure 7:
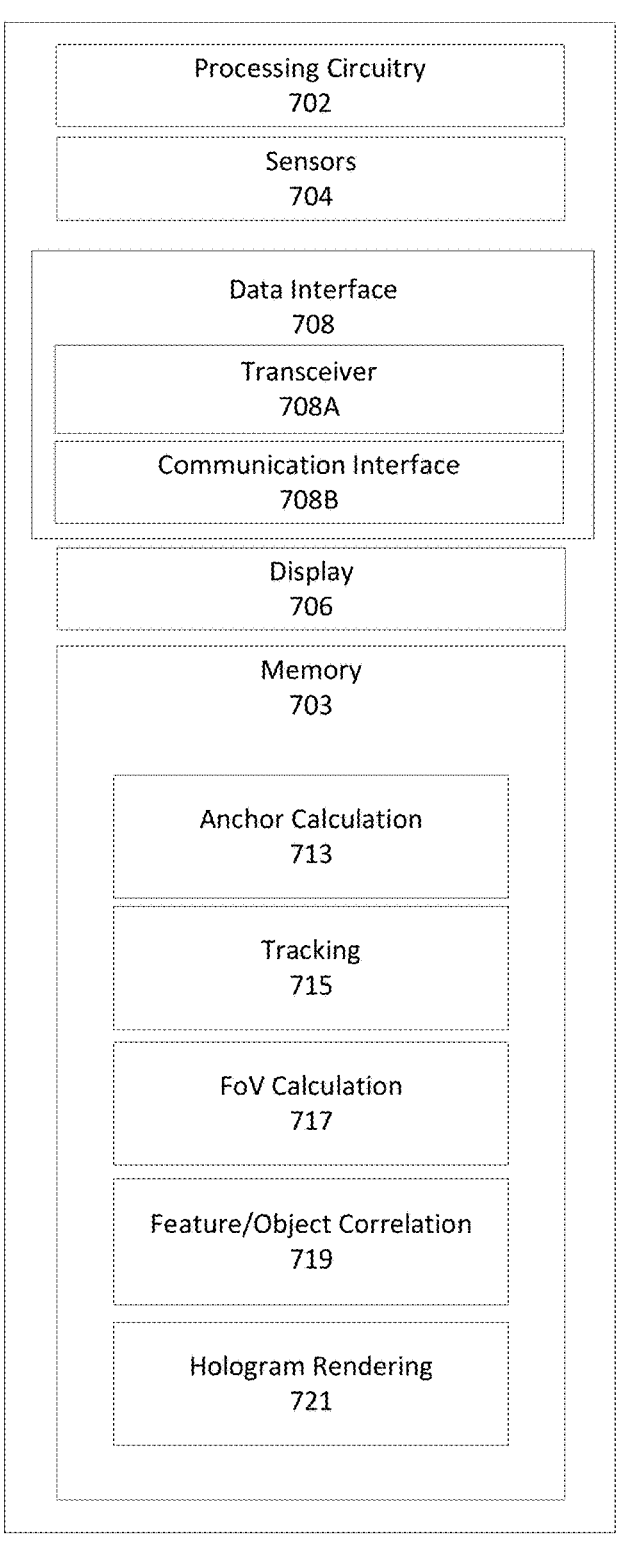
FIG. 7 illustrates a block diagram of an exemplary computing device, in accordance with one or more aspects of the present disclosure.

FIG. 7 illustrates a block diagram of an exemplary computing device, in accordance with aspects of the disclosure. In an aspect, the computing device 700 as shown and described with respect to FIG. 7 may be identified with a standalone device that may be utilized to perform the aspects as described herein inside or outside of a vehicular environment. Thus, the computing device 700 may perform the functionality as described herein with respect to the AR device 301, the external device 350, and/or the in-vehicle processor(s) 102 as discussed above with respect to FIG. 3. The computing device 700 may represent the various components of a single hardware device that implements each of the components as shown herein or, alternatively, the various components of the computing device 700 may be divided among any suitable number of hardware devices (e.g. the AR device 301, the external device 350, and/or the in-vehicle processor(s) 102), which may communicate with one another as noted above with reference to FIG. 3. For instance, the sensors 704 and the display 710 may be identified with the AR device 301, such as AR glasses, whereas the processing circuitry 702 and the memory 703 may be identified with the external device 350. The data interface 708, which comprises the transceiver 708A and communication interface 708B, may be identified with both the AR device 301 and the external device 350 to enable communication between these devices.

In any event, the computing device 700 is configured to perform the various functions as discussed herein to present graphical representations of features, objects, etc. in an AR view that is correlated with a user's FoV. This may include identifying the location (e.g. relative to a vehicle cabin) position, and orientation of the computing device 700, determining a current FoV of the user of the computing device 700 based upon the current location, position, and orientation of the computing device 700, determining the features, objects, or other suitable information derived from AV map data or other suitable data sources to display within the user FoV, and causing the display 706 to present graphical representations of the features, objects, or other suitable information in an AR view.

To do so, the computing device 700 may include processing circuitry 702, sensors 704, a data interface 708 that comprises the transceiver 708A and the communication interface 708B, a display 706, and a memory 703. The components shown in FIG. 7 are provided for ease of explanation, and aspects include the computing device 700 implementing additional, less, or alternative components as those shown in FIG. 7.

In an embodiment, the various components of the computing device 700 may be identified with those previously described with respect to the AR device 301. For example, the processing circuitry 702, the sensors 704, the data interface 708, the display 706, and the memory 703 may be identified with, be identical to, or operate in substantially the same manner as the one or more processors 302, the sensors 304, the data interface 308, the display 306, and the memory 303 of the AR device 301 as discussed herein with respect to FIG. 3. The components of the computing device 700 may alternatively be identified with components of the external device 350.

In various aspects, the processing circuitry 702 may be configured as any suitable number and/or type of computer processors, which may function to control the computing device 700 and/or components of the computing device 700. The processing circuitry 702 may be identified with one or more processors (or suitable portions thereof) implemented by the computing device 700. For example, the processing circuitry 702 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, aspects include the processing circuitry 702 being configured to carry out instructions to perform arithmetical, logical, and/or input/output (I/O) operations, and/or to control the operation of one or more components of computing device 700 to perform various functions associated with the aspects as described herein. For example, the processing circuitry 702 may include one or more microprocessor cores, memory registers, buffers, clocks, etc., and may generate electronic control signals associated with the components of the computing device 700 to control and/or modify the operation of these components. For example, aspects include the processing circuitry 702 communicating with and/or controlling functions associated with the sensors 704, the data interface 708, the display 706, and/or the memory 703. The processing circuitry 702 may additionally perform various operations as discussed herein with reference to the one or more processors of the safety system 200 identified with the vehicle 100 to selectively present graphical representations of the features, objects, or other suitable information derived from the AV map data (or other data source as noted herein) in an AR view.

In an aspect, the sensors 704 may be implemented as any suitable number and/or type of sensors that may be used to determine the geographic location of the computing device 700 and the position and orientation of the computing device 400 as worn by a user, which may be used to calculate a corresponding occupant FoV. Examples of such sensors may include positioning systems for localization (e.g. GNSS systems), cameras, IMU sensors such as compasses, gyroscopes, accelerometers, etc., ultrasonic sensors, infrared sensors, thermal sensors, digital compasses, RADAR, LIDAR, optical sensors, etc.

In an aspect, the data interface 708 may comprise the transceiver 708A, which may be implemented as any suitable number and/or type of components configured to transmit and/or receive data and/or wireless signals in accordance with any suitable number and/or type of communication protocols. The transceiver 708A may include any suitable type of components to facilitate this functionality, including components associated with known transceiver, transmitter, and/or receiver operation, configurations, and implementations. Although depicted in FIG. 7 as a transceiver, the transceiver 708A may include any suitable number of transmitters, receivers, or combinations of these that may be integrated into a single transceiver or as multiple transceivers or transceiver modules. For example, the transceiver 708A may include components typically identified with an RF front end and include, for example, antennas, ports, power amplifiers (PAs), RF filters, mixers, local oscillators (LOs), low noise amplifiers (LNAs), upconverters, downconverters, channel tuners, etc.

Regardless of the particular implementation, the transceiver 708A may include one or more components configured to transmit and/or receive AV map data as discussed herein, which may be used to determine the geographic location of the computing device 700 with respect to various known landmarks, as well as the identification of features, objects, or other information to display within the user's FoV as noted herein.

In an aspect, the communication interface 708B may be configured as any suitable number and/or type of components configured to facilitate the transceiver 708A receiving and/or transmitting data and/or signals in accordance with one or more communication protocols, as discussed herein. For example, the communication interface 708B may be implemented as any suitable number and/or type of components that function to interface with the transceiver 708A, such as analog-to-digital converters (ADCs), digital to analog converters, intermediate frequency (IF) amplifiers and/or filters, modulators, demodulators, baseband processors, etc. The communication interface 708B may thus work in conjunction with the transceiver 708A and form part of an overall communication circuitry implemented by the computing device 700.

In an aspect, the display 706 may be implemented as any suitable type of display that may be controlled and/or modified by the processing circuitry 702 to selectively present features, objects, or other information to display within the user's FoV as noted herein. The display 706 may have any suitable shape and operate in accordance with any suitable type of resolution and color palette. For instance, the display 706 may be identified with AR glasses or a motorcycle visor, as discussed herein. Alternatively, the display 706 may be identified with a projection system that projects an image onto a suitable medium (such as a vehicle windshield).

In an aspect, the memory 703 stores data and/or instructions such that, when the instructions are executed by the processing circuitry 702, cause the computing device 700 to perform various functions as described herein, such as those described above, for example. The memory 703 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 703 may be non-removable, removable, or a combination of both. For example, the memory 703 may be implemented as a non-transitory computer readable medium storing one or more executable instructions such as, for example, logic, algorithms, code, etc.

As further discussed below, the instructions, logic, code, etc., stored in the memory 703 are represented by the various modules as shown in FIG. 7, which may enable the aspects disclosed herein to be functionally realized. Alternatively, if the aspects described herein are implemented via hardware, the modules shown in FIG. 7 associated with the memory 703 may include instructions and/or code to facilitate control and/or monitor the operation of such hardware components. In other words, the modules shown in FIG. 7 are provided for ease of explanation regarding the functional association between hardware and software components. Thus, aspects include the processing circuitry 702 executing the instructions stored in these respective modules in conjunction with one or more hardware components to perform the various functions associated with the aspects as further discussed herein.

In an aspect, the executable instructions stored in the anchor calculation module 713 may facilitate, in conjunction with execution via the processing circuitry 702, the computing device 700 identifying one or more anchor objects. Again, the anchor objects may include parts of the vehicle 100, predefined markers, or any other suitable object that is located inside or outside the vehicle 100. The anchor calculation process may include the processing circuitry 702 implementing any suitable type of image and/or object recognition process to identify the anchor objects based upon a comparison to known object types or shapes. Alternatively, the anchor objects may be calculated based upon a predetermined use in the vehicle, i.e. a priori knowledge of specific anchor objects inside or outside of the vehicle 100 that are to be used for this purpose.

In an aspect, the executable instructions stored in the tracking module 715 may facilitate, in conjunction with execution via the processing circuitry 702, the computing device 700 calculating the user's FoV based upon the relative position and orientation between the computing device 700 and the AR display plane within the vehicle 100 (e.g. the windshield) using the relative position of each of the identified anchor objects, as discussed above with reference to FIG. 3.

It is noted that the examples described with reference to FIG. 7 include the use of anchor object tracking as one example to calculate and track the relative position and orientation between the AR device 301 and the presentation plane within the vehicle 100. However, this is one example, and any suitable alternative tracking and localization techniques may be implemented for this purpose, as noted herein.

In an aspect, the executable instructions stored in the FoV identification module 717 may facilitate, in conjunction with execution via the processing circuitry 702, the computing device 700 identifying a FoV of a user with respect to a current position and orientation of the user's head and eyes, which may be used to calculate the user's FoV as noted herein. This may include, for instance, analyzing the sensor data collected via the sensors 704 to identify a location and orientation of the user's head in three-dimensional space, the location of the user's eyes, the direction of the user's gaze, etc.

In an aspect, the executable instructions stored in the feature/object correlation model 719 may facilitate, in conjunction with execution via the processing circuitry 702, the determination of specific features, objects, or other suitable information from the AV map data or other suitable data sources as noted herein that corresponds to the identified user FoV. This may include, for example, performing a filtering operation that screens other graphical objects, features, etc. from the vehicle FoV view that are outside of the user's FoV. This filtering process may be performed, for example, by selecting a set of pixels based upon the angle of the user FoV and comparing fetched objects from the relevant angle. Additionally or alternatively, clipping may be used based upon the range of objects and a desired predefined relevancy or preference that may be identified a priori, such that the display is not unnecessarily cluttered with irrelevant and/or far objects. In this way, only a range of pixels are displayed that correspond to relevant and near (i.e. within a predetermined threshold distance from the user) features and objects that are contained within the user's FoV.

In an aspect, the executable instructions stored in the hologram rendering module 721 may facilitate, in conjunction with execution via the processing circuitry 702, the generation of an AR display frame that includes a graphical representation of the specific features, objects, or other suitable information that corresponds to the identified user FoV. The hologram rendering module 721 may include instructions to enable the processing circuitry 702 to implement the display 706, which again may be a projector or other suitable type of display, to ensure that the AR display frame is presented at the appropriate dimensions and contains the appropriate graphical representations. This may include incorporating content received via the in-vehicle processor(s) 102 as shown in FIGS. 3 and 5, which may include dynamic data detected via operation of the safety system 200 in addition to or instead of the information derived from the AV map data as noted herein.

EXAMPLES

The following examples pertain to further aspects.

An example (e.g. example 1) relates to a vehicle. The vehicle comprises processing circuitry configured to: determine a geographic location of the vehicle using autonomous vehicle (AV) map data that includes landmarks and corresponding predetermined geographic locations; compute a vehicle FoV that is associated with a position and orientation of the vehicle at the geographic location of the vehicle; compute an occupant field of view (FoV) associated with an occupant of the vehicle, identify one or more features and/or objects identified by the AV map data that are contained within the vehicle FoV; determine a relative location of the identified one or more features and/or objects with respect to the vehicle using the AV map data; and generate an augmented reality (AR) display frame based upon the geographic location of the vehicle, the occupant FoV, and the relative location of the identified one or more features and objects; and a display configured to present, in an AR view, the AR display frame that comprises a graphical representation associated with the one or more identified features and/or objects that are contained within the occupant FoV.

Another example (e.g. example 2) relates to a previously-described example (e.g. example 1), wherein the display comprises a heads up vehicle display.

Another example (e.g. example 3) relates to a previously-described example (e.g. one or more of examples 1-2), wherein the heads up vehicle display comprises an inner surface of a windshield of the vehicle.

Another example (e.g. example 4) relates to a previously-described example (e.g. one or more of examples 1-3), wherein the one or more identified features and/or objects are overlaid at corresponding locations, relative to the occupant FoV, where associated physical objects or physical features reside.

Another example (e.g. example 5) relates to a previously-described example (e.g. one or more of examples 1-4), wherein the processing circuitry is configured to calculate an ego-motion of the vehicle, and to determine a position and orientation of the vehicle using the ego-motion.

Another example (e.g. example 6) relates to a previously-described example (e.g. one or more of examples 1-5), wherein the display is configured to present, in the AR view, the graphical representation of the one or more identified features and/or objects that are contained within the occupant FoV based upon the position and orientation of the vehicle.

Another example (e.g. example 7) relates to a previously-described example (e.g. one or more of examples 1-6), wherein the processing circuitry is configured to: compute a delay period between (i) when the position and orientation of the vehicle was calculated, and (ii) when the AR display frame was generated; and present, in the AR view, the graphical representation of the one or more identified features and/or objects within the vehicle FoV by selectively compensating for changes in the position and orientation of the vehicle during the delay period.

Another example (e.g. example 8) relates to a previously-described example (e.g. one or more of examples 1-7), wherein the processing circuitry is configured to selectively compensate for changes in the position and orientation of the vehicle during the delay period by tracking the ego-motion of the vehicle, and adjusting the vehicle FoV to match an updated position and orientation of the vehicle corresponding to when the AR display frame was generated.

Another example (e.g. example 9) relates to a previously-described example (e.g. one or more of examples 1-8), wherein the processing circuitry is configured to compensate for changes in the position and orientation of the vehicle during the delay period when the delay period exceeds a predetermined threshold time period.

Another example (e.g. example 10) relates to a previously-described example (e.g. one or more of examples 1-9), wherein the processing circuitry is configured to: compute a delay period between (i) when the position and orientation of the vehicle was calculated, and (ii) when the AR display frame was generated; and when the delay period exceeds a predetermined threshold time period, adjust one or more parameters regarding a manner in which the ego-motion of the vehicle is calculated to reduce the delay.

Another example (e.g. example 11) relates to a previously-described example (e.g. one or more of examples 1-10), wherein the processing circuitry is further configured to identify one or more further features and/or objects that are contained within the vehicle FoV, the one or more further features and/or objects being detected via one or more sensors, wherein the display is configured to present, in the AR view, a graphical representation of the identified one or more further features and/or objects within the occupant FoV.

Another example (e.g. example 12) relates to a previously-described example (e.g. one or more of examples 1-11), wherein the identified one or more further features and/or objects are overlaid at corresponding locations, relative to the FoV of the occupant of the vehicle, where associated physical objects or physical features reside.

Another example (e.g. example 13) relates to a previously-described example (e.g. one or more of examples 1-12), wherein the one or more sensors comprise one or more light detection and ranging (LIDAR) sensors.

Another example (e.g. example 14) relates to a previously-described example (e.g. one or more of examples 1-13), wherein the one or more further features and/or objects comprise one or more pedestrians.

Another example (e.g. example 15) relates to a previously-described example (e.g. one or more of examples 1-14), wherein the one or more further features and/or objects identify a trajectory of the vehicle in accordance with an advanced driver assistance system (ADAS).

Another example (e.g. example 16) relates to a previously-described example (e.g. one or more of examples 1-15), wherein the processing circuitry is further configured to identify a dangerous situation that is estimated or predicted in accordance with an applied safety driving model (SDM), and to generate the AR display frame by adding a warning display feature in the AR frame when the dangerous situation is identified.

Another example (e.g. example 17) relates to a previously-described example (e.g. one or more of examples 1-16), wherein the warning display feature is overlaid in the AR display frame at a location relative to the occupant FoV that corresponds to a location of an object that is associated with the identified dangerous situation.

Another example (e.g. example 18) relates to a previously-described example (e.g. one or more of examples 1-17), wherein the location of the warning display feature is overlaid in the AR display frame at a location associated with an estimated focus point location of the occupant of the vehicle.

An example (e.g. example 19) relates to a non-transitory computer readable medium. The non-transitory computer readable medium is configured to store instructions that, when executed by processing circuitry of an augmented reality (AR) device, cause the AR device to: receive, via a communication link with a vehicle, data including (i) a geographic location of the vehicle, (ii) autonomous vehicle (AV) map data that includes landmarks and corresponding predetermined geographic locations, and (iii) a position and orientation of the vehicle; compute an occupant field of view (FoV) using sensor data indicative of a position and orientation of the AR device, the occupant FoV being associated with an occupant of the vehicle wearing the AR device; compute a vehicle FoV based upon the position and orientation of the vehicle at the geographic location of the vehicle; identify one or more features and/or objects identified by the AV map data that are contained within the vehicle FoV; determine a relative location of the identified one or more features and/or objects with respect to the vehicle using the AV map data; generate an AR display frame based upon the geographic location of the vehicle, the occupant FoV, and the relative location of the identified one or more features and objects; and cause a display of the AR device to present, in an AR view within the occupant FoV, the AR display frame that comprises a graphical representation of the one or more identified features and objects.

Another example (e.g. example 20) relates to a previously-described example (e.g. example 19), wherein the display comprises an AR glasses display.

Another example (e.g. example 21) relates to a previously-described example (e.g. one or more of examples 19-20), wherein the display comprises a motorcycle helmet visor display.

Another example (e.g. example 22) relates to a previously-described example (e.g. one or more of examples 19-21), wherein the one or more identified features and/or objects are overlaid at corresponding locations, relative to the occupant FoV, where associated physical objects or physical features reside.

Another example (e.g. example 23) relates to a previously-described example (e.g. one or more of examples 19-22), wherein the instructions, when executed by the processing circuitry, further cause the AR device to: compute a delay period between (i) when the position and orientation of the vehicle was computed, and (ii) when the AR display frame was generated; and present, in the AR view, the graphical representation of the one or more identified features and/or objects by selectively compensating for changes in the position and orientation of the vehicle during the delay period.

Another example (e.g. example 24) relates to a previously-described example (e.g. one or more of examples 19-23), wherein the instructions, when executed by the processing circuitry, further cause the AR device to selectively compensate for changes in the position and orientation of the vehicle during the delay period by tracking the received position and orientation of the vehicle, and adjusting the vehicle FoV to match an updated position and orientation of the vehicle corresponding to when the AR display frame was generated.

Another example (e.g. example 25) relates to a previously-described example (e.g. one or more of examples 19-24), wherein the instructions, when executed by the processing circuitry, further cause the AR device to compensate for changes in the position and orientation of the vehicle during the delay period when the delay period exceeds a predetermined threshold time period.

Another example (e.g. example 26) relates to a previously-described example (e.g. one or more of examples 19-25), wherein the instructions, when executed by the processing circuitry, further cause the AR device to: compute a delay period between (i) when the position and orientation of the vehicle was calculated, and (ii) when the AR display frame was generated; and when the delay period exceeds a predetermined threshold time period, adjust one or more parameters regarding a manner in which data is received via the communication link to reduce the delay.

Another example (e.g. example 27) relates to a previously-described example (e.g. one or more of examples 19-26), wherein the instructions, when executed by the processing circuitry, further cause the AR device to: compute a delay period between (i) when the position and orientation of the vehicle was calculated, and (ii) when the AR display frame was generated; and when the delay period exceeds a predetermined threshold time period, transmit a request to the vehicle via the communication link to adjust one or more parameters regarding a manner in which the position and orientation of the vehicle is computed to reduce the delay.

Another example (e.g. example 28) relates to a previously-described example (e.g. one or more of examples 19-27), wherein the instructions, when executed by the processing circuitry, further cause the AR device to: identify one or more further features and/or objects that are contained within the vehicle FoV, the one or more further objects being detected via one or more vehicle sensors, and cause the display is configured to present, in the AR view, a graphical representation of the identified one or more further features and objects.

Another example (e.g. example 29) relates to a previously-described example (e.g. one or more of examples 19-28), wherein the identified one or more further features and/or objects are overlaid at corresponding locations, relative to the occupant FoV, where associated physical objects or physical features reside.

Another example (e.g. example 30) relates to a previously-described example (e.g. one or more of examples 19-29), wherein the one or more vehicle sensors comprise one or more light detection and ranging (LIDAR) sensors.

Another example (e.g. example 31) relates to a previously-described example (e.g. one or more of examples 19-30), wherein the one or more further features and/or objects comprise one or more pedestrians.

Another example (e.g. example 32) relates to a previously-described example (e.g. one or more of examples 19-31), wherein the one or more further features and/or objects identify a trajectory of the vehicle in accordance with an advanced driver assistance system (ADAS).

Another example (e.g. example 33) relates to a previously-described example (e.g. one or more of examples 19-32), wherein the instructions, when executed by the processing circuitry, further cause the AR device to identify a dangerous situation that is estimated or predicted in accordance with an applied safety driving model (SDM), and to generate the AR display frame by adding a warning display feature in the AR frame when the dangerous situation is identified.

Another example (e.g. example 34) relates to a previously-described example (e.g. one or more of examples 19-33), wherein the warning display feature is overlaid in the AR display frame at a location relative to the occupant FoV that corresponds to a location of an object that is associated with the identified dangerous situation.

Another example (e.g. example 35) relates to a previously-described example (e.g. one or more of examples 19-34), wherein the location of the warning display feature is overlaid in the AR display frame at a location associated with an estimated focus point location of the occupant of the vehicle.

An example (e.g. example 36) relates to an augmented reality (AR) device. The AR device comprises a data interface configured to receive, via a communication link with a vehicle, data including (i) a geographic location of the vehicle, (ii) autonomous vehicle (AV) map data that includes landmarks and corresponding predetermined geographic locations, and (iii) a position and orientation of the vehicle; processing circuitry configured to: compute an occupant field of view (FoV) using sensor data indicative of a position and orientation of the AR device, the occupant FoV being associated with an occupant of the vehicle wearing the AR device; compute a vehicle FoV based upon the position and orientation of the vehicle at the geographic location of the vehicle; identify one or more features and/or objects identified by the AV map data that are contained within the vehicle FoV; determine a relative location of the identified one or more features and/or objects with respect to the vehicle using the AV map data; generate an AR display frame based upon the geographic location of the vehicle, the occupant FoV, and the relative location of the identified one or more features and objects; and a display configured to present, in an AR view within the occupant FoV, the AR display frame that comprises a graphical representation of the one or more identified features and objects.

Another example (e.g. example 37) relates to a previously-described example (e.g. example 36), wherein the display comprises an AR glasses display.

Another example (e.g. example 38) relates to a previously-described example (e.g. one or more of examples 36-37), wherein the display comprises a motorcycle helmet visor display.

Another example (e.g. example 39) relates to a previously-described example (e.g. one or more of examples 36-38), wherein the one or more identified features and/or objects are overlaid at corresponding locations, relative to the occupant FoV, where associated physical objects or physical features reside.

Another example (e.g. example 40) relates to a previously-described example (e.g. one or more of examples 36-39), wherein the processing circuitry is further configured to: compute a delay period between (i) when the position and orientation of the vehicle was computed, and (ii) when the AR display frame was generated; and present, in the AR view, the graphical representation of the one or more identified features and/or objects by selectively compensating for changes in the position and orientation of the vehicle during the delay period.

Another example (e.g. example 41) relates to a previously-described example (e.g. one or more of examples 36-40), wherein the instructions, wherein the processing circuitry is further configured to selectively compensate for changes in the position and orientation of the vehicle during the delay period by tracking the received position and orientation of the vehicle, and adjusting the vehicle FoV to match an updated position and orientation of the vehicle corresponding to when the AR display frame was generated.

Another example (e.g. example 42) relates to a previously-described example (e.g. one or more of examples 36-41), wherein the instructions, wherein the processing circuitry is further configured to cause the AR device to compensate for changes in the position and orientation of the vehicle during the delay period when the delay period exceeds a predetermined threshold time period.

Another example (e.g. example 43) relates to a previously-described example (e.g. one or more of examples 36-42), wherein the processing circuitry is further configured to: compute a delay period between (i) when the position and orientation of the vehicle was calculated, and (ii) when the AR display frame was generated; and when the delay period exceeds a predetermined threshold time period, adjust one or more parameters regarding a manner in which data is received via the communication link to reduce the delay.

Another example (e.g. example 44) relates to a previously-described example (e.g. one or more of examples 36-43), wherein the processing circuitry is further configured to: compute a delay period between (i) when the position and orientation of the vehicle was calculated, and (ii) when the AR display frame was generated; and when the delay period exceeds a predetermined threshold time period, transmit a request to the vehicle via the communication link to adjust one or more parameters regarding a manner in which the position and orientation of the vehicle is computed to reduce the delay.

Another example (e.g. example 45) relates to a previously-described example (e.g. one or more of examples 36-44), wherein the processing circuitry is further configured to: identify one or more further features and/or objects that are contained within the vehicle FoV, the one or more further objects being detected via one or more vehicle sensors, and cause the display is configured to present, in the AR view, a graphical representation of the identified one or more further features and objects.

Another example (e.g. example 46) relates to a previously-described example (e.g. one or more of examples 36-45), wherein the identified one or more further features and/or objects are overlaid at corresponding locations, relative to the occupant FoV, where associated physical objects or physical features reside.

Another example (e.g. example 47) relates to a previously-described example (e.g. one or more of examples 36-46), wherein the one or more vehicle sensors comprise one or more light detection and ranging (LIDAR) sensors.

Another example (e.g. example 48) relates to a previously-described example (e.g. one or more of examples 36-47), wherein the one or more further features and/or objects comprise one or more pedestrians.

Another example (e.g. example 49) relates to a previously-described example (e.g. one or more of examples 36-48), wherein the one or more further features and/or objects identify a trajectory of the vehicle in accordance with an advanced driver assistance system (ADAS).

Another example (e.g. example 50) relates to a previously-described example (e.g. one or more of examples 36-49), wherein the processing circuitry is further configured to identify a dangerous situation that is estimated or predicted in accordance with an applied safety driving model (SDM), and to generate the AR display frame by adding a warning display feature in the AR frame when the dangerous situation is identified.

Another example (e.g. example 51) relates to a previously-described example (e.g. one or more of examples 36-50), wherein the warning display feature is overlaid in the AR display frame at a location relative to the occupant FoV that corresponds to a location of an object that is associated with the identified dangerous situation.

Another example (e.g. example 52) relates to a previously-described example (e.g. one or more of examples 36-49), wherein the location of the warning display feature is overlaid in the AR display frame at a location associated with an estimated focus point location of the occupant of the vehicle.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vehicle, comprising:
processing circuitry configured to:
   determine a geographic location of the vehicle using autonomous vehicle (AV) map data that includes landmarks and corresponding predetermined geographic locations;
   compute a vehicle field of view (FoV) that is associated with a position and orientation of the vehicle at the geographic location of the vehicle;
   compute an occupant FoV associated with an occupant of the vehicle;
   identify one or more features and/or objects identified by the AV map data that are contained within the vehicle FoV;
   determine a relative location of the identified one or more features and/or objects with respect to the vehicle using the AV map data;
   generate an augmented reality (AR) display frame based upon the geographic location of the vehicle, the occupant FoV, and the relative location of the identified one or more features and/or objects; and
   compute a delay period between (i) when the position and orientation of the vehicle was calculated, and (ii) when the AR display frame was generated; and
a display configured to present, in an AR view, the AR display frame that comprises a graphical representation of the one or more identified features and/or objects that are contained within the occupant FoV by selectively compensating for changes in the position and orientation of the vehicle during the delay period.

2. The vehicle of claim 1, wherein the display comprises a heads heads-up vehicle display.

3. The vehicle of claim 2, wherein the heads up vehicle display comprises an inner surface of a windshield of the vehicle.

4. The vehicle of claim 1, wherein the one or more identified features and/or objects are overlaid at corresponding locations, relative to the occupant FoV, where associated physical features and/or physical objects reside.

5. The vehicle of claim 1, wherein the processing circuitry is configured to calculate ego-motion of the vehicle, and to determine the position and orientation of the vehicle using the ego-motion.

6. The vehicle of claim 5, wherein the processing circuitry is configured to selectively compensate for changes in the position and orientation of the vehicle during the delay period by tracking the ego-motion of the vehicle and adjusting the vehicle FoV to match an updated position and orientation of the vehicle corresponding to when the AR display frame was generated.

7. The vehicle of claim 6, wherein the processing circuitry is configured to compensate for changes in the position and orientation of the vehicle during the delay period when the delay period exceeds a predetermined threshold time period.

8. The vehicle of claim 1, wherein the display is configured to present, in the AR view, the graphical representation of the one or more identified features and/or objects that are contained within the occupant FoV based upon the position and orientation of the vehicle.

9. The vehicle of claim 1, wherein the processing circuitry is further configured to identify one or more further features and/or objects that are contained within the vehicle FoV, the one or more further features and/or objects being detected via one or more sensors, and
   wherein the display is configured to present, in the AR view, a graphical representation of the identified one or more further features and/or objects within the occupant FoV.

10. The vehicle of claim 9, wherein the identified one or more further features and/or objects are overlaid at corresponding locations, relative to the occupant FoV, where associated physical features and/or physical objects reside.

11. The vehicle of claim 9, wherein the one or more sensors comprise one or more light detection and ranging (LIDAR) sensors.

12. The vehicle of claim 9, wherein the one or more further features and/or objects includes objects derived from an applied safety driving model (SDM).

13. The vehicle of claim 9, wherein the one or more further features and/or objects identify a trajectory of the vehicle in accordance with an advanced driver assistance system (ADAS).

14. The vehicle of claim 1, wherein the processing circuitry is further configured to identify a dangerous situation that is estimated or predicted in accordance with an applied safety driving model (SDM), and to generate the AR display frame by adding a warning display feature in the AR frame when the dangerous situation is identified.

15. The vehicle of claim 14, wherein the warning display feature is overlaid in the AR display frame at a location relative to the occupant FoV that corresponds to a location of an object that is associated with the identified dangerous situation.

16. The vehicle of claim 14, wherein the location of the warning display feature is overlaid in the AR display frame at a location associated with an estimated focus point location of the occupant of the vehicle.

17. A non-transitory computer readable medium configured to store instructions that, when executed by processing circuitry of an augmented reality (AR) device, cause the AR device to:

receive, via a communication link with a vehicle, data including (i) a geographic location of the vehicle, (ii) autonomous vehicle (AV) map data that includes landmarks and corresponding predetermined geographic locations, and (iii) a position and orientation of the vehicle;

compute an occupant field of view (FoV) using sensor data indicative of a position and orientation of the AR device, the occupant FoV being associated with an occupant of the vehicle wearing the AR device;

compute a vehicle FoV based upon the position and orientation of the vehicle at the geographic location of the vehicle;

identify one or more features and/or objects identified by the AV map data that are contained within the vehicle FOV;

determine a relative location of the identified one or more features and/or objects with respect to the vehicle using the AV map data;

generate an AR display frame based upon the geographic location of the vehicle, the occupant FoV, and the relative location of the identified one or more features and/or objects;

compute a delay period between (i) when the position and orientation of the vehicle was calculated, and (ii) when the AR display frame was generated; and cause a display of the AR device to present, in an AR view within the occupant FoV, the AR display frame that comprises a graphical representation of the one or more identified features and/or objects by selectively compensating for changes in the position and orientation of the vehicle during the delay period.

18. The non-transitory computer readable medium of claim 17, wherein the instructions, when executed by the processing circuitry, cause the AR device to calculate an ego-motion of the vehicle, and to determine the position and orientation of the vehicle using the ego-motion.

19. The non-transitory computer readable medium of claim 18, wherein the instructions, when executed by the processing circuitry, cause the AR device to selectively compensate for changes in the position and orientation of the vehicle during the delay period by tracking the ego-motion of the vehicle and adjusting the vehicle FoV to match an updated position and orientation of the vehicle corresponding to when the AR display frame was generated.

20. The non-transitory computer readable medium of claim 19, wherein the instructions, when executed by the processing circuitry, cause the AR device to compensate for changes in the position and orientation of the vehicle during the delay period when the delay period exceeds a predetermined threshold time period.

21. An augmented reality (AR) device, comprising:

a data interface configured to receive, via a communication link with a vehicle, data including (i) a geographic location of the vehicle, (ii) autonomous vehicle (AV) map data that includes landmarks and corresponding predetermined geographic locations, and (iii) a position and orientation of the vehicle;

processing circuitry configured to:

compute an occupant field of view (FoV) using sensor data indicative of a position and orientation of the AR device, the occupant FoV being associated with an occupant of the vehicle wearing the AR device;

compute a vehicle FoV based upon the position and orientation of the vehicle at the geographic location of the vehicle;

identify one or more features and/or objects identified by the AV map data that are contained within the vehicle FoV;

determine a relative location of the identified one or more features and/or objects with respect to the vehicle using the AV map data; and generate an AR display frame based upon the geographic location of the vehicle, the occupant FoV, and the relative location of the identified one or more features and/or objects; and compute a delay period between (i) when the position and orientation of the vehicle was computed, and (ii) when the AR display frame was generated; and a display configured to present, in an AR view within the occupant FoV, the AR display frame that comprises a graphical representation of the one or more identified features and/or objects by selectively compensating for changes in the position and orientation of the vehicle during the delay period.

22. The AR device of claim 21, wherein the processing circuitry is configured to calculate ego-motion of the vehicle, and to determine the position and orientation of the vehicle using the ego-motion.

23. The AR device of claim 22, wherein the processing circuitry is configured to selectively compensate for changes in the position and orientation of the vehicle during the delay period by tracking the ego-motion of the vehicle and adjusting the vehicle FoV to match an updated position and orientation of the vehicle corresponding to when the AR display frame was generated.

24. The AR device of claim 23, wherein the processing circuitry is configured to compensate for changes in the position and orientation of the vehicle during the delay period when the delay period exceeds a predetermined threshold time period.

* * * * *